(12) United States Patent
Hayashi et al.

(10) Patent No.: US 11,629,674 B2
(45) Date of Patent: Apr. 18, 2023

(54) VALVE DEVICE

(71) Applicant: DENSO CORPORATION, Kariya (JP)

(72) Inventors: Hideki Hayashi, Kariya (JP); Yuichiro Moritani, Kariya (JP); Shogo Tateishi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/879,223

(22) Filed: Aug. 2, 2022

(65) Prior Publication Data

US 2023/0044245 A1   Feb. 9, 2023

(30) Foreign Application Priority Data

Aug. 4, 2021 (JP) .............................. JP2021-128441

(51) Int. Cl.
| | |
|---|---|
| *F02B 47/08* | (2006.01) |
| *F02M 26/72* | (2016.01) |
| *F16K 11/18* | (2006.01) |
| *F02D 41/00* | (2006.01) |
| *F16K 31/524* | (2006.01) |
| *F02M 26/22* | (2016.01) |

(52) U.S. Cl.
CPC ........... *F02M 26/72* (2016.02); *F02D 41/005* (2013.01); *F02M 26/22* (2016.02); *F16K 11/18* (2013.01); *F16K 31/52416* (2013.01); *F16K 31/52441* (2013.01)

(58) Field of Classification Search
CPC ........ F02M 26/70; F02M 26/21; F02M 26/48; F02M 26/51
USPC .................................................... 123/568.12
See application file for complete search history.

(56) References Cited

U.S. PATENT DOCUMENTS

| | | |
|---|---|---|
| 2010/0199957 A1 | 8/2010 | Furukawa et al. |
| 2013/0025576 A1 | 1/2013 | Busato et al. |
| 2014/0345566 A1 | 11/2014 | Lallemant et al. |
| 2016/0281651 A1 | 9/2016 | Hashimoto |
| 2019/0171943 A1* | 6/2019 | Pao .......................... G06F 16/29 |
| 2019/0264620 A1* | 8/2019 | Moritani ................. F16K 27/04 |

OTHER PUBLICATIONS

U.S. Appl. No. 17/879,177, to Yuichiro Moritani et al., entitled "Valve Device", filed Aug. 2, 2022 (70 pages).
U.S. Appl. No. 17/879,206, to Shogo Tateishi et al., entitled "Valve Device", filed Aug. 2, 2022 (54 pages).
U.S. Appl. No. 17/879,177, filed Aug. 2, 2022, Valve Device.
U.S. Appl. No. 17/879,206, filed Aug. 2, 2022, Valve Device.

\* cited by examiner

*Primary Examiner* — Long T Tran
*Assistant Examiner* — James J Kim
(74) *Attorney, Agent, or Firm* — Nixon & Vanderhye P.C.

(57) ABSTRACT

A valve device increases or decreases a flow rate of EGR gas. The valve device includes a housing, a bypass valve body, an EGR valve body. The housing includes a first upstream passage into which the EGR gas cooled by an EGR cooler flows, a second upstream passage into which the EGR gas that bypasses the EGR cooler flows, a junction connected to each of a gas-flow downstream side of the first upstream passage and a gas-flow downstream side of the second upstream passage, and a downstream passage connected to the first upstream passage and the second upstream passage via the junction. The bypass valve body opens and closes the second upstream passage. The EGR valve body is provided in the downstream passage, rotates around an EGR valve axis.

4 Claims, 15 Drawing Sheets

VALVE DEVICE

CROSS REFERENCE TO RELATED APPLICATIONS

This application is based on Japanese Patent Application No. 2021-128441 filed on Aug. 4, 2021, the disclosure of which is incorporated herein by reference.

TECHNICAL FIELD

The present disclosure relates to a valve device that increases or decreases the flow rate of EGR gas.

BACKGROUND

A valve device has been provided. An exemplary valve device includes a first flap and a second flap that are valve bodies for opening and closing a passage through which a fluid flows. The first flap and the second flap are interlocked with each other by a gear link mechanism including a plurality of mutually meshing gears.

SUMMARY

The present disclosure provides a valve device increases or decreases a flow rate of EGR gas. The valve device includes a housing, a bypass valve body, an EGR valve body. The housing includes a first upstream passage into which the EGR gas cooled by an EGR cooler flows, a second upstream passage into which the EGR gas that bypasses the EGR cooler flows, a junction connected to each of a gas-flow downstream side of the first upstream passage and a gas-flow downstream side of the second upstream passage, and a downstream passage connected to the first upstream passage and the second upstream passage via the junction. The bypass valve body opens and closes the second upstream passage. The EGR valve body is provided in the downstream passage, rotates around an EGR valve axis.

BRIEF DESCRIPTION OF DRAWINGS

The features and advantages of the present disclosure will become more apparent from the following detailed description made with reference to the accompanying drawings. In the drawings.

DETAILED DESCRIPTION

Figure 1:
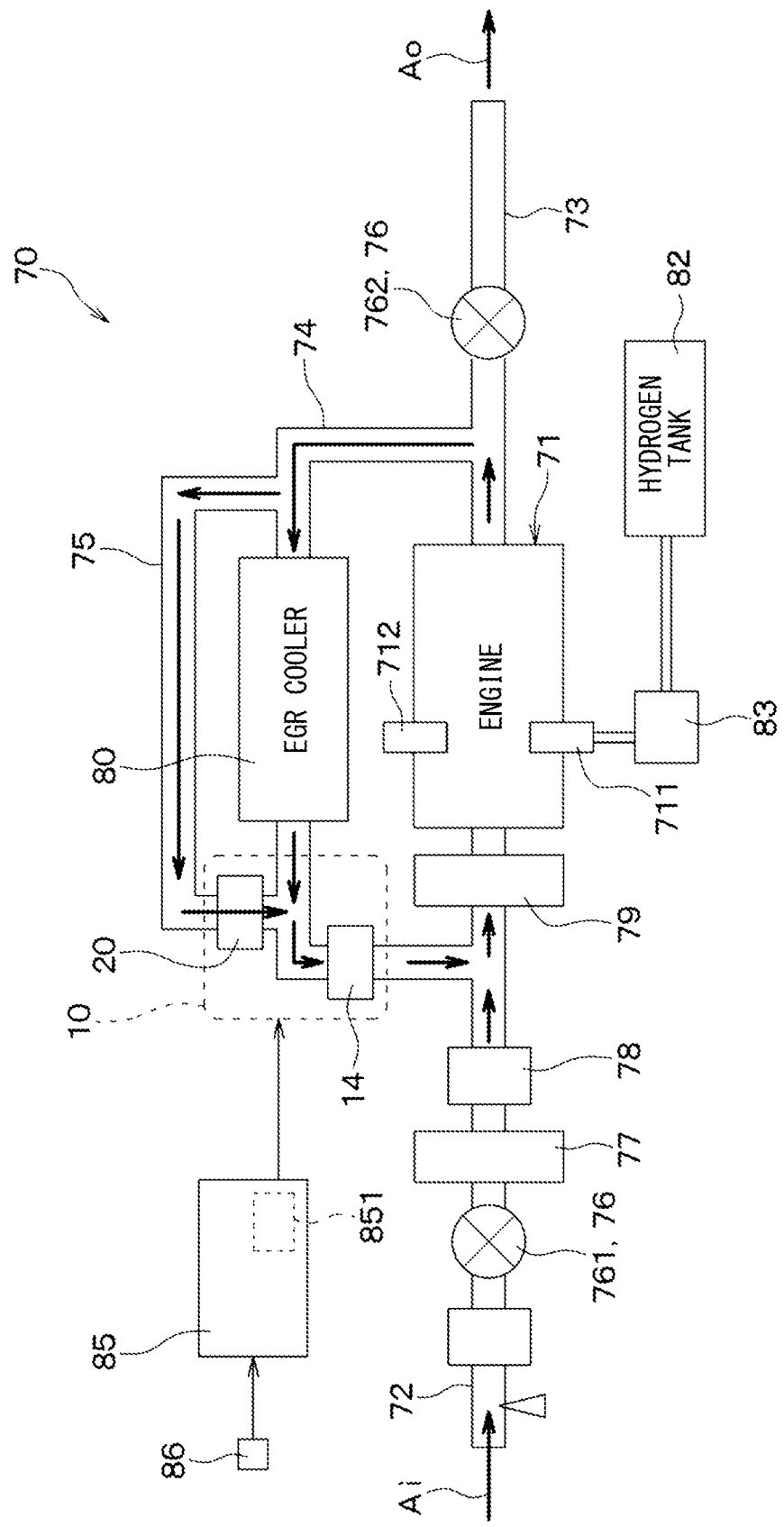
FIG. 1 is a diagram schematically illustrating a schematic configuration of an internal combustion engine system including a valve device in a first embodiment.

The inventors have considered using a valve device in which a plurality of valve bodies (for example, first and second flaps) are interlocked via a mechanical link mechanism as a valve device (that is, an EGR valve device) that increases or decreases the flow rate of the EGR gas. The inventors have found that during the warm-up of an engine, the valve body of the EGR valve device may be cooled, and if high-humidity EGR gas hits a surface of the cooled valve body, condensed water is generated.

The present disclosure provides a valve device capable of suppressing generation of condensed water due to EGR gas hitting an EGR valve body.

An exemplary embodiment of the present disclosure provides a valve device that increases or decreases a flow rate of EGR gas. The valve device includes a housing, a bypass valve body, an EGR valve body, and an interlocking portion. The housing includes a first upstream passage into which the EGR gas cooled by an EGR cooler flows, a second upstream passage into which the EGR gas that bypasses the EGR cooler flows, a junction connected to each of a gas-flow downstream side of the first upstream passage and a gas-flow downstream side of the second upstream passage, and a downstream passage connected to the first upstream passage and the second upstream passage via the junction. The bypass valve body opens and closes the second upstream passage. The EGR valve body that is provided in the downstream passage, rotates around an EGR valve axis, is controlled to rotate within a warming-up rotational range, which is predetermined, during warm-up of an engine, and reduces an opening degree of the downstream passage as the EGR valve body rotates to one side in a circumferential direction of the EGR valve axis within the warming-up rotational range. The interlocking portion interlocks the bypass valve body with a rotational operation of the EGR valve body. One of the first upstream passage and the second upstream passage is connected in series to the downstream passage via the junction in a same direction as a direction of the downstream passage. The other of the first upstream passage and the second upstream passage is connected to the downstream passage via the junction in a direction intersecting the direction of the downstream passage, and is defined as the other passage. The EGR valve body has a one side end provided on one side in a valve body lateral direction that is perpendicular to the EGR valve axis and is a direction toward which the EGR valve body is extended, and an other side end provided on an other side in the valve body lateral direction. In a state where the EGR valve body fully opens the downstream passage, the one side end or the other side end is located upstream with respect to a side edge that is an edge of an extended space and a closest edge to the downstream passage. The extended space is obtained by virtually extending the other passage toward a direction of the other passage. In a case where the one side end or the other side end is located upstream with respect to the side edge, as the EGR valve body rotates to the one side in the circumferential direction, an upstream side end located upstream with respect to the side edge, among the one side end and the other side end, is moved away from the other passage.

In the exemplary embodiment of the present disclosure, in the warming-up rotational range, the EGR valve body hardly prevents the EGR gas flowing from the first upstream passage from being mixed with the EGR gas flowing from the second upstream passage. The EGR gas cooled by the EGR cooler and flowing from the first upstream passage is thus mixed with the EGR gas bypassing the EGR cooler and flowing from the second upstream passage to rise in temperature, and then hits the EGR valve body. The surface temperature of the EGR valve body on the side that the EGR gas mainly hits also increases early.

As a result, it is possible to suppress generation of condensed water due to high-humidity EGR gas hitting the low-temperature EGR valve body. As the EGR valve body is disposed to be shifted to the gas-flow upstream side in the downstream passage so as to reduce the interval between the EGR valve body and the bypass valve body while the generation of condensed water is suppressed, the valve device can be downsized.

Hereinafter, each embodiment will be described with reference to the drawings. In each of the following embodiments, the same or equivalent parts are denoted by the same reference numerals in the drawings.

First Embodiment

As illustrated in FIG. 1, in the present embodiment, a valve device 10 constitutes a part of an internal combustion engine system 70 that is provided in a vehicle for traveling of the vehicle. The internal combustion engine system 70 generates driving force for traveling by igniting hydrogen as fuel and burning the hydrogen. The internal combustion engine system 70 includes the valve device 10, and also includes an engine 71, an intake passage 72, an exhaust passage 73, an EGR passage 74, a bypass passage 75, a turbocharger 76, an intercooler 77, a throttle valve 78, an intake manifold 79, an EGR cooler 80, and a control device 85.

The engine 71 is a power source for traveling of the vehicle. The engine 71 includes an injector 711 and an ignition plug 712 in order to burn hydrogen, which is fuel. The intake passage 72 is connected to the intake side of the engine 71 via the intake manifold 79, and the exhaust passage 73 is connected to the exhaust side of the engine 71.

In the internal combustion engine system 70, fresh air, which is external air, is sucked from the upstream end of the intake passage 72 as indicated by an arrow Ai, and the fresh air is taken into a combustion chamber of the engine 71 from the intake passage 72 via the intake manifold 79. The fuel (specifically, hydrogen) stored in a fuel tank 82 is decompressed by a decompression valve 83 and then supplied to the injector 711 of the engine 71.

The engine 71 ignites and combusts an air-fuel mixture obtained by mixing the fuel injected from the injector 711 and the intake air taken from the intake passage 72 by the ignition plug 712 in the combustion chamber, thereby generating the driving force for traveling. The exhaust gas after combustion passes through the exhaust passage 73 and is discharged from the downstream end of the exhaust passage 73 to the outside of a vehicle as indicated by an arrow Ao. In FIG. 1, gas flows in the passages 72, 73, 74, and 75 are indicated by thick arrows.

In the intake passage 72, a compressor 761 of the turbocharger 76, the intercooler 77, and the throttle valve 78 are disposed in order from the upstream side. A turbine 762 of the turbocharger 76 is disposed in the exhaust passage 73.

In the turbocharger 76, an impeller of the compressor 761 and an impeller of the turbine 762 are directly connected to each other, and these impellers rotate integrally. As a result, the turbocharger 76 uses an exhaust gas flow in the exhaust passage 73 to promote the suction of air from the outside to the intake passage 72.

The intercooler 77 cools the air passing through the intercooler 77. The throttle valve 78 increases or decreases the opening degree of the intake passage 72, thereby increasing or decreasing the flow rate of the air flowing through the intake passage 72.

The EGR passage 74 is a gas passage for allowing a part of the exhaust gas discharged from the engine 71 to flow to the intake side of the engine 71 as EGR gas. The upstream end of the EGR passage 74 is connected to a gas-flow downstream side of the engine 71 and a gas-flow upstream side of the turbine 762 in the exhaust passage 73. The downstream end of the EGR passage 74 is connected to a gas-flow downstream side of the throttle valve 78 and a gas-flow upstream side of the intake manifold 79 in the intake passage 72. As a result, the EGR gas flows into the intake passage 72 from the EGR passage 74, and is sucked into the engine 71 through the intake manifold 79 together with the fresh air flowing through the intake passage 72.

The EGR cooler 80 is disposed in the EGR passage 74. The EGR cooler 80 is, for example, a heat exchanger, and cools the EGR gas flowing through the EGR passage 74 by heat exchange between a cooling fluid and the EGR gas.

The bypass passage 75 is a gas passage for allowing the EGR gas to flow while bypassing the EGR cooler 80. The upstream end of the bypass passage 75 is thus connected to a gas-flow upstream side of the EGR cooler 80 in the EGR passage 74. The downstream end of the bypass passage 75 is connected to a gas-flow downstream side of the EGR cooler 80 in the EGR passage 74.

In the present embodiment, as the bypass passage 75 allows the EGR gas to flow while bypassing the EGR cooler 80, the temperature of the EGR gas is controlled to be equal to or higher than the dew point on the gas-flow downstream side of a connection portion of the EGR passage 74 to which the downstream end of the bypass passage 75 is connected. As a result, generation of condensed water is suppressed on the gas-flow downstream side of the connection portion. In particular, since the engine 71 of the present embodiment is a hydrogen engine, for example, EGR gas containing about 2.4 times as much water vapor as an existing diesel engine flows into the EGR passage 74 from the exhaust passage 73. Therefore, it is important to suppress generation of condensed water.

The control device 85 includes a microcomputer including a CPU, a ROM, a RAM, and the like (not illustrated), and executes a computer program stored in a semiconductor memory such as a ROM or a RAM, which is a non-transitory tangible recording medium. The control device 85 functions as an engine control device that executes various control related to the engine 71, and executes operation control of the engine 71, the throttle valve 78, the valve device 10, and the like.

For example, the control device 85 includes an EGR control unit 851 that controls the valve device 10. The EGR control unit 851 operates a motor 24 of the valve device 10 to control the direction of an EGR valve body 14 (in other words, the attitude of an EGR valve body 14) of the valve device 10. The EGR control unit 851 includes a microcomputer similarly to the control device 85, and executes a computer program stored in a semiconductor memory such as a ROM or a RAM. By executing this computer program, a method corresponding to the computer program is performed. The EGR control unit 851 and the valve device 10 constitute an EGR control system that controls the flow rate and the temperature of the EGR gas.

The valve device 10 increases or decreases the flow rate of the EGR gas flowing through the bypass passage 75, and also increases or decreases the flow rate (that is, the EGR flow rate) of the EGR gas flowing from the EGR passage 74 to the intake passage 72. The valve device 10 is thus provided at a passage connecting portion at which the EGR passage 74 and the bypass passage 75 are connected on the gas-flow downstream side of the EGR cooler 80.

Figure 2:
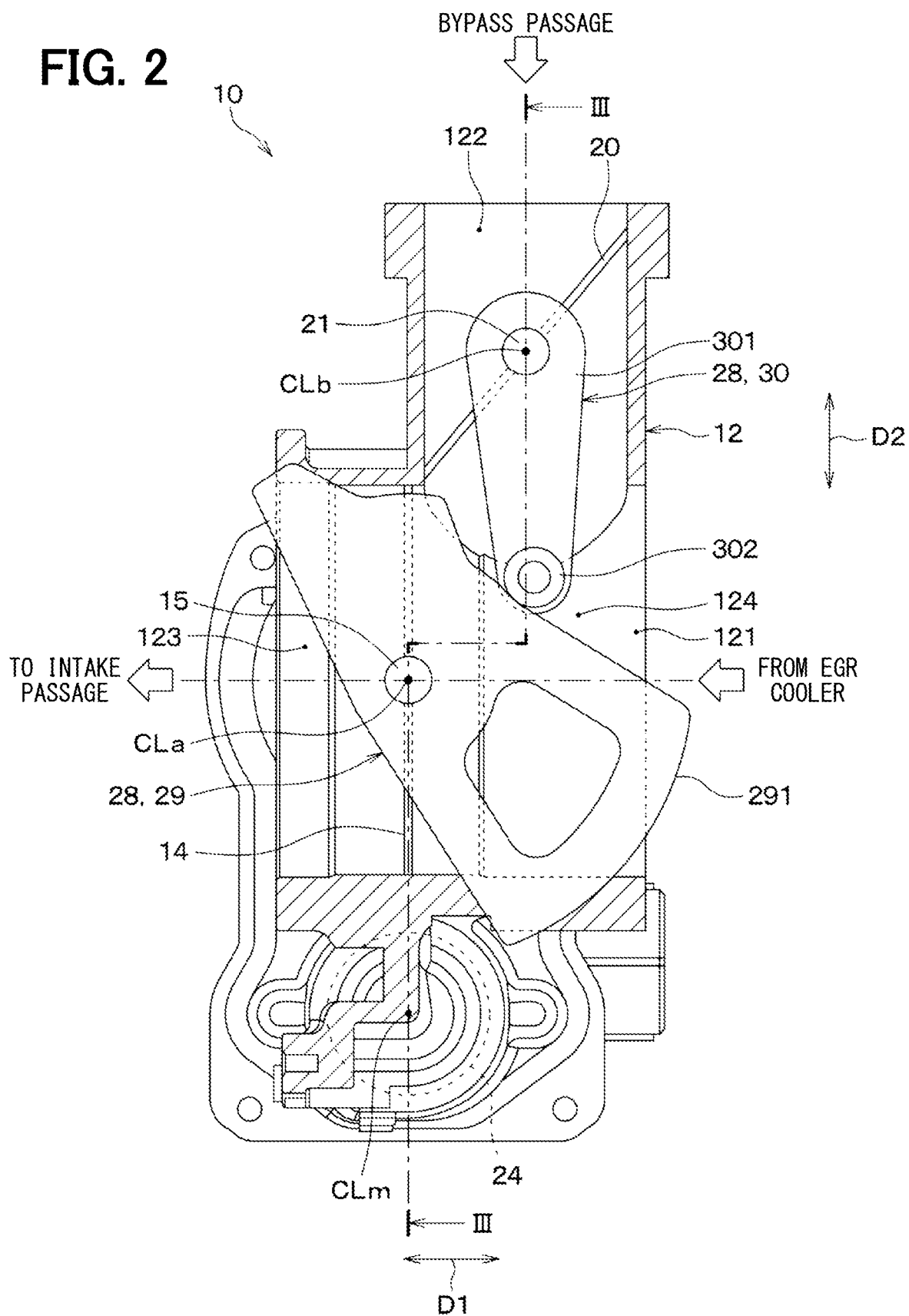
FIG. 2 is a diagram illustrating the valve device of the first embodiment, and is a partial cross-sectional view of a housing of the valve device, taken along a line perpendicular to an EGR valve axis.
Figure 3:
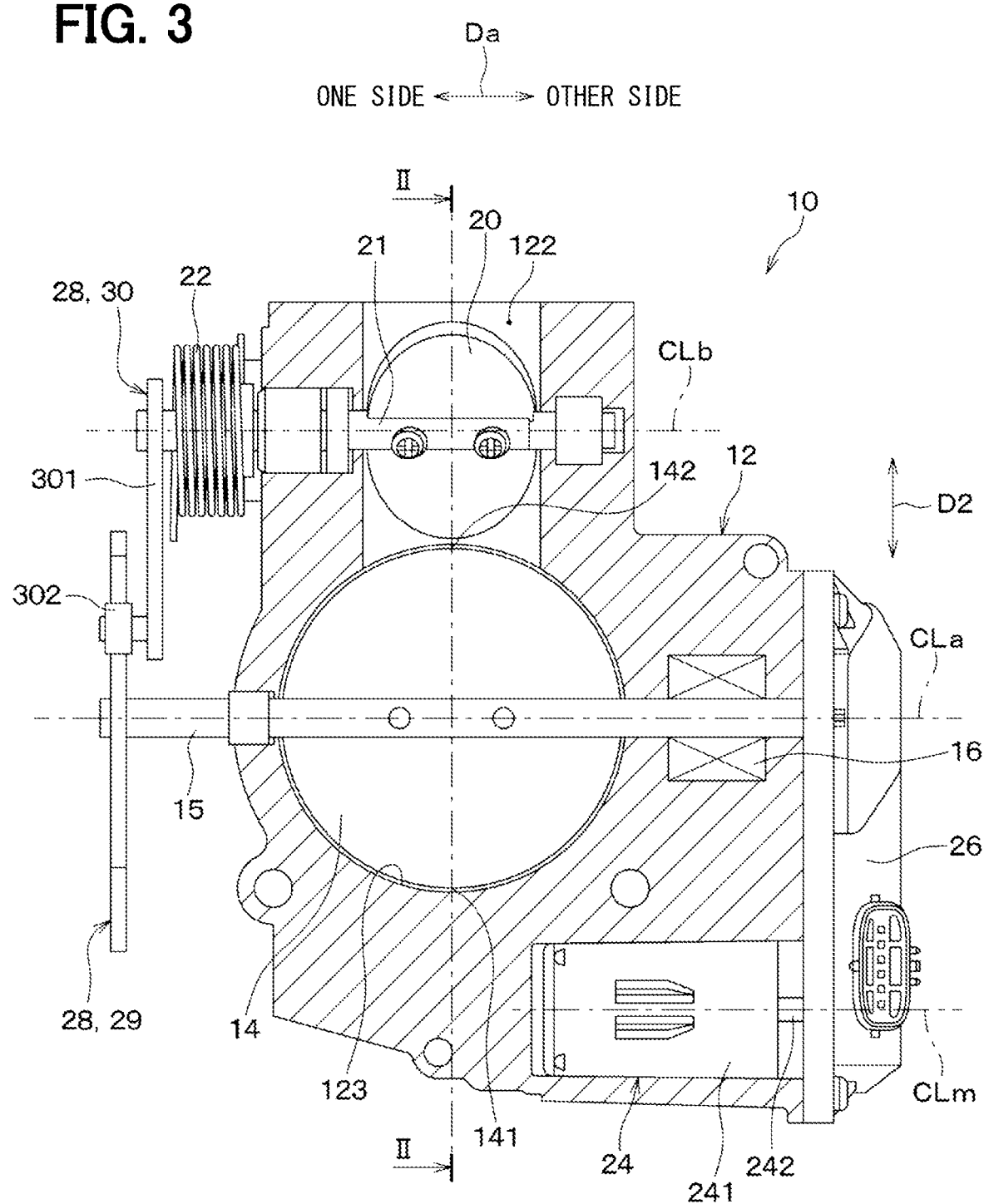
FIG. 3 is a diagram of the valve device of the first embodiment as viewed from a side of a first upstream passage, and is a partial cross-sectional view of the housing of the valve device taken along line III-III in FIG. 2.

As illustrated in FIGS. 2 and 3, the valve device 10 includes a housing 12, the EGR valve body 14, an EGR valve shaft 15, an EGR valve urging portion 16, a bypass valve body 20, a bypass valve shaft 21, a bypass valve urging portion 22, the motor 24, a speed reduction device 26, and an interlocking portion 28. In FIG. 2, the housing 12 is illustrated in a cross-section taken along line II-II in FIG. 3. In FIG. 2, and FIGS. 5 and 8 to 15 to be described later, white arrows indicate the flow of the EGR gas.

As illustrated in FIGS. 1 to 3, the housing 12 forms an outer shell of the valve device 10 and is a non-rotating member that does not rotate. A first upstream passage 121, a second upstream passage 122, a downstream passage 123, and a junction 124 through which EGR gas flows are formed inside the housing 12. That is, the housing 12 is a passage forming portion with the plurality of passages 121, 122, and 123 formed therein.

The first upstream passage 121, the junction 124, and the downstream passage 123 are connected in series from the gas-flow upstream side in the order of the first upstream passage 121, the junction 124, and the downstream passage 123 along a first passage direction D1, and form one linearly extending passage. That is, the direction of the first upstream passage 121 and the direction of the downstream passage 123 are the same, and both are the first passage direction D1. The first upstream passage 121 is connected in series to the downstream passage 123 via the junction 124. In the present embodiment, the first upstream passage 121 corresponds to one passage in the present disclosure.

The first upstream passage 121, the junction 124, and the downstream passage 123 constitute a part of the EGR passage 74 on the gas-flow downstream side of the EGR cooler 80. The EGR gas cooled by the EGR cooler 80 thus flows into the first upstream passage 121. For example, one passage including the first upstream passage 121, the junction 124, and the downstream passage 123 has a circular shape in a cross-section perpendicular to the first passage direction D1.

The second upstream passage 122 includes a downstream end of the bypass passage 75 and constitutes a part of the bypass passage 75. The EGR gas having bypassed the EGR cooler 80 thus flows into the second upstream passage 122.

The second upstream passage 122 is also a passage linearly extending along a second passage direction D2. The second passage direction D2 is a direction intersecting the first passage direction D1, strictly speaking, a direction perpendicular to the first passage direction D1. That is, the direction of the second upstream passage 122 is the second passage direction D2, and the second upstream passage 122 is disposed in a direction intersecting the first upstream passage 121 and the downstream passage 123. In the present embodiment, the second upstream passage 122 corresponds to the other passage in the present disclosure.

For example, the second upstream passage 122 has a circular shape in a cross-section perpendicular to the second passage direction D2. The second upstream passage 122 has a smaller diameter than the first upstream passage 121 and the downstream passage 123.

Figure 4:
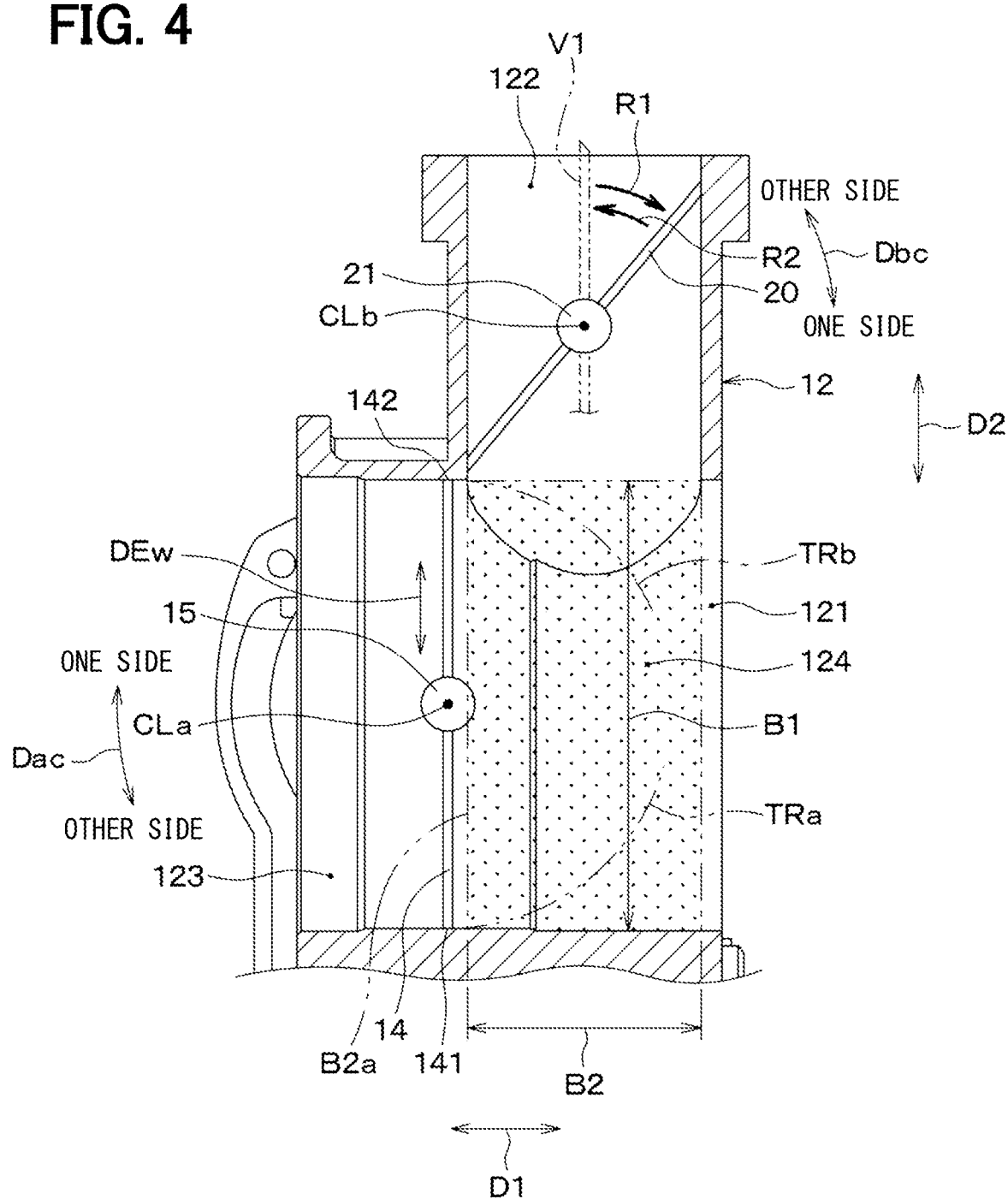
FIG. 4 is a partial cross-sectional view in which an interlocking portion, a motor, and the vicinity thereof are omitted from FIG. 2.

As illustrated in FIGS. 2 to 4, the downstream passage 123 is connected to the gas-flow downstream side of the first upstream passage 121 and the second upstream passage 122 via the junction 124. That is, the junction 124 is connected to each of the gas-flow downstream side of the first upstream passage 121, the gas-flow downstream side of the second upstream passage 122, and the gas-flow upstream side of the downstream passage 123. The EGR gas flowing out of the first upstream passage 121 and the EGR gas flowing out of the second upstream passage 122 thus merges and flows into the downstream passage 123.

As illustrated in FIG. 4, for example, the junction 124 is formed as a space in which a space B1 obtained by virtually extending the first upstream passage 121 along the direction of the first upstream passage 121 and a space B2 obtained by virtually extending the second upstream passage 122 along the direction of the second upstream passage 122 overlap each other. In the present embodiment, the direction of the first upstream passage 121 is the first passage direction D1, and the direction of the second upstream passage 122 is the second passage direction D2. In FIG. 4, dotted hatching is applied to the junction 124.

As illustrated in FIGS. 2 to 4, the EGR valve body 14 is disposed in the downstream passage 123 and rotates around an EGR valve axis CLa. The EGR valve body 14 rotates around the EGR valve axis CLa to open and close the downstream passage 123. The EGR valve axis CLa is an axis along a valve shaft direction Da perpendicular to the first passage direction D1 and the second passage direction D2.

The EGR valve axis CLa is located at the center of the width of the downstream passage 123 in the second passage direction D2.

Specifically, the EGR valve body 14 is a butterfly valve body, and for example, is formed in a circular shape conforming to the cross-sectional shape of the downstream passage 123 and in a plate shape along the valve shaft direction Da. The plate shape along the valve shaft direction Da is, in other words, a plate shape with a thickness in a direction perpendicular to the EGR valve axis CLa.

The EGR valve body 14 has a one side end 141 and the other side end 142. The one side end 141 of the EGR valve body 14 is provided on one side of the EGR valve body 14 in an EGR valve body lateral direction DEw that is perpendicular to the EGR valve axis CLa and along the EGR valve body 14. The other side end 142 of the EGR valve body 14 is provided on the other side of the EGR valve body 14 in the EGR valve body lateral direction DEw. The EGR valve body lateral direction DEw corresponds to a valve body lateral direction in the present disclosure, and is one of the radial directions of the EGR valve axis CLa.

Figure 5:
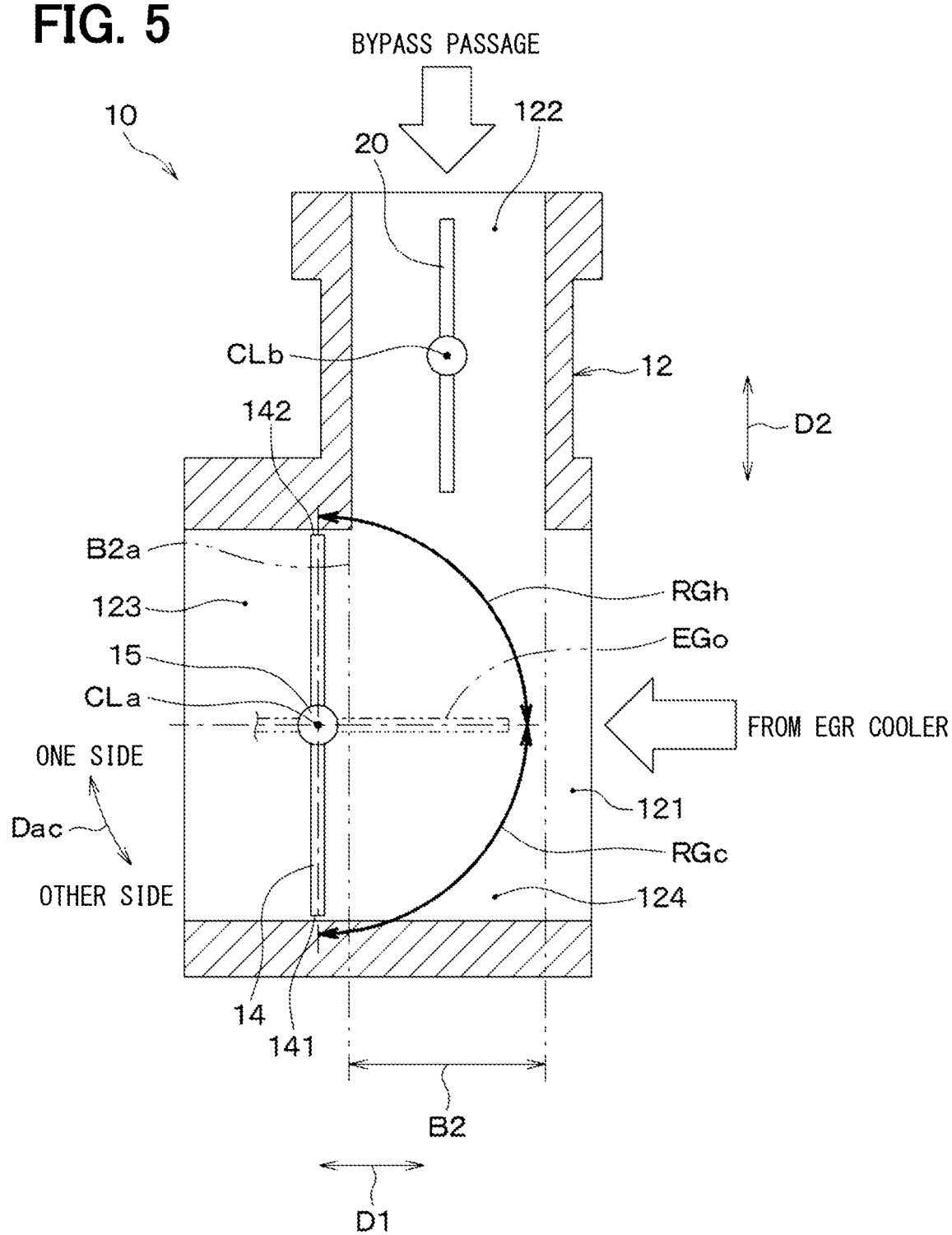
FIG. 5 is a cross-sectional view of the valve device schematically illustrating a cross-section corresponding to FIG. 4 in the first embodiment, and is a diagram illustrating a warming-up rotational range and an after-warm-up rotational range of an EGR valve body.

In FIG. 4, a part of a one end trajectory TRa followed by the one side end 141 of the EGR valve body 14 and a part of the other end trajectory TRb followed by the other side end 142 of the EGR valve body 14 are indicated by two-dot chain lines. FIGS. 4 and 5 illustrate the extended space B2 obtained by virtually extending the second upstream passage 122 along the direction of the second upstream passage 122. As can be seen from the extended space B2 and the trajectories TRa and TRb in FIG. 4, in a state where the EGR valve body 14 fully opens the downstream passage 123, the one side end 141 or the other side end 142 is located on the gas-flow upstream side of a side edge B2a of the extended space B2 on the side of the downstream passage 123.

A two-dot chain line EGo in FIG. 5 indicates a part of the EGR valve body 14 in a fully open state of the downstream passage 123. In FIG. 5, the bypass valve body 20 is merely schematically illustrated, and the attitude of the bypass valve body 20 is not accurate with respect to the actual attitude.

As illustrated in FIGS. 2 to 4, the EGR valve shaft 15 is a rotating shaft rotatably supported by the housing 12. The EGR valve body 14 is fixed to the EGR valve shaft 15 by screwing or the like, and the EGR valve shaft 15 and the EGR valve body 14 integrally rotate about the EGR valve axis CLa. The EGR valve shaft 15 extends from a fixed position of the EGR valve body 14 to each of both sides in the valve shaft direction Da, and is rotatably supported by the housing 12 on each of both sides of the EGR valve body 14 in the valve shaft direction Da.

The EGR valve urging portion 16 functions as a return spring that urges the EGR valve body 14, and includes, for example, one or a plurality of torsion coil springs. The EGR valve urging portion 16 is housed in the housing 12. The EGR valve urging portion 16 constantly urges the EGR valve body 14 via the EGR valve shaft 15 so that the EGR valve body 14 returns to a predetermined reference rotational position Nr (see FIG. 6). Therefore, when the motor 24 is not energized and is not driven, the EGR valve body 14 is returned to the reference rotational position Nr of the EGR valve body 14 by the urging force of the EGR valve urging portion 16.

The reference rotational position Nr of the EGR valve body 14 in the present embodiment is a fully-closed rotational position at which the EGR valve body 14 fully closes the downstream passage 123, specifically, a rotational position of the EGR valve body 14 shown in FIGS. 2 to 4. That is, when the EGR valve body 14 is at the reference rotational position Nr, the downstream passage 123 is fully closed.

The fully closed state of the downstream passage 123 means that the opening degree of the downstream passage 123 is 0%, and in the fully closed state of the downstream passage 123, the flow of the EGR gas is blocked in the downstream passage 123 except for the leakage of the EGR gas. The fully open state of the downstream passage 123 means that the opening degree of the downstream passage 123 is 100%, that is, the opening degree of the downstream passage 123 is set to the maximum opening degree within the movable range of the EGR valve body 14. The fully closed and fully open states of the second upstream passage 122 are similar to the fully closed and fully open states of the downstream passage 123.

In the present embodiment, the EGR valve body 14 rotates from the reference rotational position Nr of the EGR valve body 14 to one side or the other side in a circumferential direction Dac of the EGR valve axis CLa. In the description of the present embodiment, the circumferential direction Dac of the EGR valve axis CLa is also referred to as "EGR valve circumferential direction Dac".

The bypass valve body 20 is disposed in the second upstream passage 122 and rotates around a bypass valve axis CLb parallel to the EGR valve axis CLa. The bypass valve body 20 rotates around the bypass valve axis CLb to open and close the second upstream passage 122. The bypass valve axis CLb is located at the center of the width of the second upstream passage 122 in the first passage direction D1.

Specifically, the bypass valve body 20 is a butterfly valve body. When fully closing the second upstream passage 122, the bypass valve body 20 closes the second upstream passage 122 in an inclined attitude with respect to the second upstream passage 122. The inclined attitude of the bypass valve body 20 with respect to the second upstream passage 122 is, in other words, the attitude of the bypass valve body 20 inclined with respect to the second passage direction D2 that is the direction in which the second upstream passage 122 extends. The bypass valve body 20 is thus formed in, for example, an elliptical plate shape along the valve shaft direction Da (in other words, a plate shape with a thickness in a direction perpendicular to the bypass valve axis CLb).

For example, when fully closing the second upstream passage 122 from an open state, the bypass valve body 20 always rotates to one side in a circumferential direction Dbc of the bypass valve axis CLb as indicated by an arrow R1 in FIG. 4. On the other hand, when fully opening the second upstream passage 122 from the fully closed state, the bypass valve body 20 always rotates to the other side in the circumferential direction Dbc of the bypass valve axis CLb as indicated by an arrow R2 in FIG. 4. In the description of the present embodiment, the circumferential direction Dbc of the bypass valve axis CLb is also referred to as "bypass valve circumferential direction Dbc". A two-dot chain line V1 in FIG. 4 indicates a part of the bypass valve body 20 at a rotational position at which the second upstream passage 122 is fully opened.

As illustrated in FIGS. 2 to 4, the bypass valve shaft 21 is a rotating shaft rotatably supported by the housing 12. The bypass valve body 20 is fixed to the bypass valve shaft 21 by screwing or the like, and the bypass valve shaft 21 and the bypass valve body 20 integrally rotate about the bypass valve axis CLb. The bypass valve shaft 21 extends from a fixed position of the bypass valve body 20 to each of both sides in the valve shaft direction Da, and is rotatably supported by the housing 12 on each of both sides of the bypass valve body 20 in the valve shaft direction Da.

The bypass valve urging portion 22 includes, for example, a torsion coil spring or the like. The bypass valve urging portion 22 is disposed outside the housing 12 and supported by the housing 12. The bypass valve urging portion 22 constantly urges the bypass valve body 20 via the bypass valve shaft 21 so that the bypass valve body 20 rotates to one side in the bypass valve circumferential direction Dbc.

Therefore, when the motor 24 is not energized and is not driven, the bypass valve body 20 is returned to a rotational position (specifically, a rotational position of the bypass valve body 20 illustrated in FIGS. 2 to 4) at which the second upstream passage 122 is fully closed by the urging force of the bypass valve urging portion 22.

The motor 24 is a drive source that rotationally operates the EGR valve body 14 and the bypass valve body 20. The motor 24 is housed in the housing 12, and includes a motor body 241 fixed to the housing 12, a motor shaft 242 that rotates around a motor axis CLm parallel to the EGR valve axis CLa, and a motor rotation sensor (not illustrated) that detects the rotation angle of the motor shaft 242.

The motor 24 rotates the motor shaft 242 based on a signal from the EGR control unit 851 in FIG. 1, and outputs a signal indicating the rotation angle of the motor shaft 242 detected by the motor rotation sensor to the EGR control unit 851. The rotation angle and the rotation direction of the motor shaft 242 are thus controlled by the EGR control unit 851. For example, when rotationally operating the EGR valve body 14 and the bypass valve body 20 against the urging force of the EGR valve urging portion 16 and the bypass valve urging portion 22, the motor 24 generates a torque that overcomes the urging force.

The motor 24 can also keep the rotation angle of the motor shaft 242 as it is by being energized, and when the motor 24 is not energized, the rotation angle of the motor shaft 242 is not kept and the motor shaft 242 can freely rotate.

The motor shaft 242 is connected to the EGR valve shaft 15 via the speed reduction device 26 so as to be capable of transmitting power. The speed reduction device 26 includes a plurality of gears that are always meshed with each other, and decelerates the rotation of the motor shaft 242 and transmits the rotation to the EGR valve shaft 15. The speed reduction device 26 also includes a case constituting a part of the outer shell of the valve device 10, and the gears included in the speed reduction device 26 are housed in the case.

The EGR valve shaft 15 is connected to the interlocking portion 28 so as to be capable of transmitting power on one side in the valve shaft direction Da of the position of the EGR valve shaft 15 fixed to the EGR valve body 14, and is connected to the speed reduction device 26 so as to be capable of transmitting power on the other side in the valve shaft direction Da of the fixed position of the EGR valve body 14. The interlocking portion 28 then connects the EGR valve shaft 15 and the bypass valve shaft 21 so as to be capable of transmitting power. Therefore, the rotational driving force of the motor 24 is transmitted to the motor shaft 242, the speed reduction device 26, the EGR valve shaft 15, the interlocking portion 28, and the bypass valve shaft 21 in this order.

As illustrated in FIGS. 2 and 3, the interlocking portion 28 is an interlocking mechanism that interlocks the bypass valve body 20 with the rotational operation of the EGR valve body 14. Specifically, the interlocking portion 28 of the present embodiment is configured as a cam link mechanism, and includes a cam 29 and a driven rotating portion 30 that is driven by the rotation of the cam 29.

The cam 29 has a flat plate shape with a thickness in the valve shaft direction Da, and is fixed to the EGR valve shaft 15. The cam 29 thus rotates around the EGR valve axis CLa integrally with the EGR valve body 14 and the EGR valve shaft 15. The cam 29 has a cam track 291 formed on a peripheral edge of the cam 29. The cam track 291 is also referred to as "profile of cam 29".

The driven rotating portion 30 includes a lever 301 that is formed in a flat plate shape and has a thickness in the valve shaft direction Da, and a roller 302 as a cam follower rotatably supported by the lever 301. The roller 302 rotates relative to the lever 301 around an axis parallel to the bypass valve axis CLb, and the axis of the roller 302 is disposed to be radially shifted with respect to the bypass valve axis CLb.

The lever 301 is fixed to the bypass valve shaft 21. The lever 301 thus rotates around the bypass valve axis CLb integrally with the bypass valve body 20 and the bypass valve shaft 21.

The bypass valve urging portion 22 urges the bypass valve body 20 fixed to the bypass valve shaft 21 as described above, and also urges the lever 301 fixed to the bypass valve shaft 21. That is, the bypass valve urging portion 22 constantly urges the lever 301 via the bypass valve shaft 21 so that the lever 301 rotates to one side in the bypass valve circumferential direction Dbc (see FIG. 4). As a result, since the roller 302 of the driven rotating portion 30 is constantly pressed against the cam track 291, the driven rotating portion 30 rotates in an interlocking manner with the rotational operation of the cam 29 while causing the roller 302 to follow the cam track 291.

Figure 6:
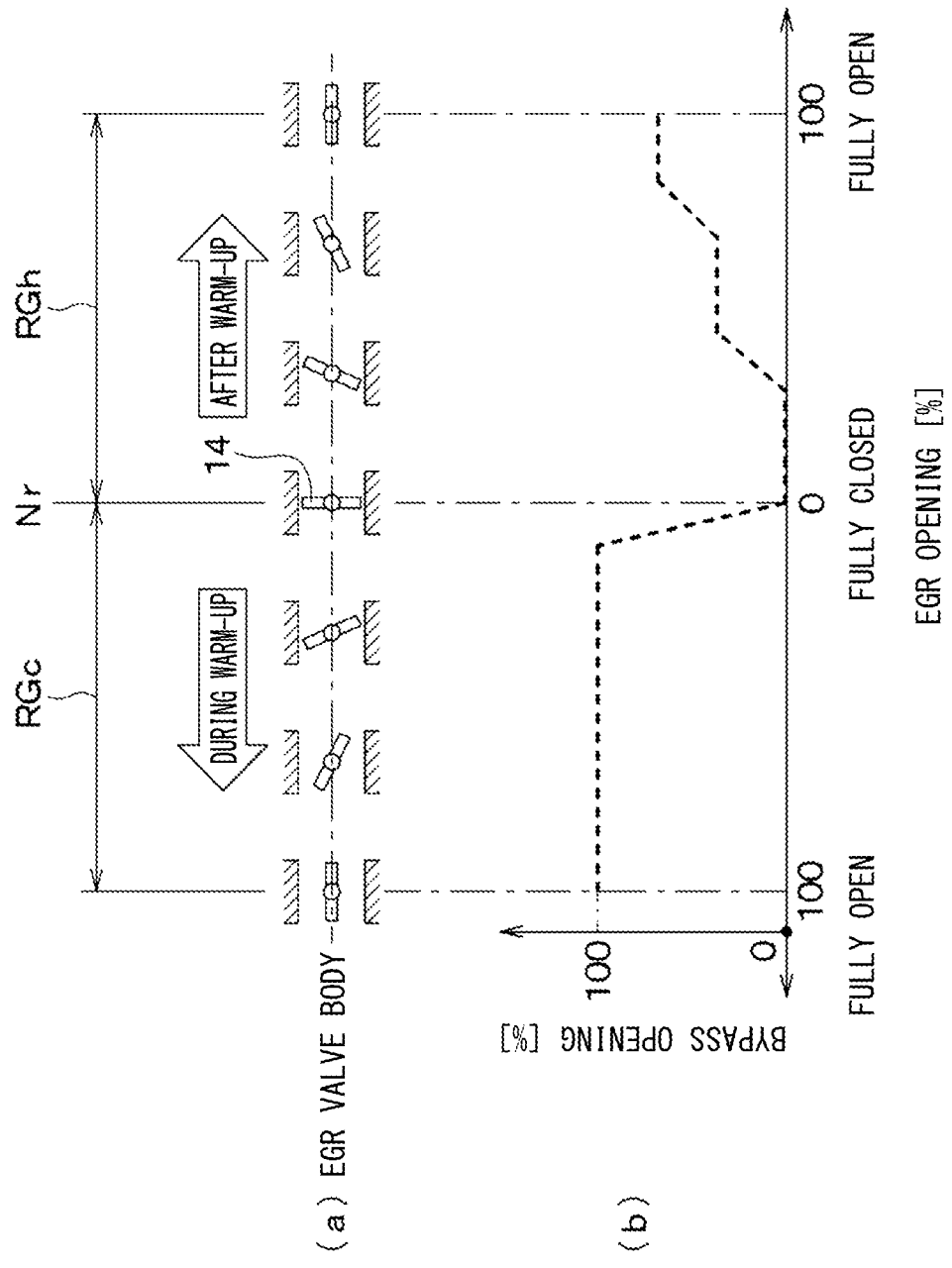
FIG. 6 schematically illustrates an attitude of the EGR valve body that changes with the rotational operation of the EGR valve body, and illustrates a passage opening degree characteristic that is a relationship between a bypass opening degree and an EGR opening degree.

As illustrated in FIGS. 4 to 6, in the present embodiment, the EGR valve body 14 is rotated by the motor 24 within the range of 90 degrees from the reference rotational position Nr of the EGR valve body 14 to one side in the EGR valve circumferential direction Dac and also within the range of 90 degrees from the reference rotational position Nr to the other side in the EGR valve circumferential direction Dac. (a) in FIG. 6 schematically illustrates the attitude of the EGR valve body 14 that changes with the rotational operation of the EGR valve body 14 as viewed in the same direction as the direction in FIG. 4.

Here, one side in the EGR valve circumferential direction Dac in the present embodiment is defined as follows. That is, in a case where the one side end 141 or the other side end 142 of the EGR valve body 14 is located on the gas-flow upstream side of the side edge B2a in FIG. 5, as the EGR valve body 14 rotates to one side in the EGR valve circumferential direction Dac, the upstream side end to be described later is moved away from the second upstream passage 122. The upstream side end is a side end located on the gas-flow upstream side of the side edge B2a, among the one side end 141 and the other side end 142 of the EGR valve body 14. In FIG. 5, the side of the first upstream passage 121 of the side edge B2a (that is, the right side of the drawing in FIG. 5) corresponds to the gas-flow upstream side of the side edge B2a.

Specifically, a warming-up rotational range RGc and an after-warm-up rotational range RGh are determined in advance as rotation ranges in which the EGR valve body 14 is rotated around the EGR valve axis CLa by the EGR control unit 851 (see FIG. 1) controlling the motor 24. The EGR valve body 14 is controlled by the EGR control unit 851 to rotate within the warming-up rotational range RGc during the warm-up of the engine 71, and is controlled by the EGR control unit 851 to rotate within the after-warm-up rotational range RGh after the warm-up of the engine 71.

The warming-up rotational range RGc is a rotation range from the reference rotational position Nr (specifically, a fully-closed rotational position in the present embodiment) of the EGR valve body 14 to a rotational position at which the EGR valve body 14 is rotated 90 degrees to the other side in the EGR valve circumferential direction Dac. On the other hand, the after-warm-up rotational range RGh is a rotation range from the reference rotational position Nr of the EGR valve body 14 to a rotational position at which the EGR valve body 14 is rotated 90 degrees to one side in the EGR valve circumferential direction Dac.

Since the warming-up rotational range RGc and the after-warm-up rotational range RGh of the EGR valve body 14 are each the rotation ranges from the reference rotational position Nr of the EGR valve body 14, the after-warm-up rotational range RGh is a rotation range following the warming-up rotational range RGc. Specifically, the reference rotational position Nr of the EGR valve body 14 is a rotational position at the boundary between the warming-up rotational range RGc and the after-warm-up rotational range RGh. The after-warm-up rotational range RGh of the EGR valve body 14 is a rotation range next to the reference rotational position Nr of the EGR valve body 14 on the opposite side to the warming-up rotational range RGc.

In the present embodiment, as illustrated in FIGS. 4 to 6, as the EGR valve body 14 rotates to one side in the EGR valve circumferential direction Dac, the opening degree of the downstream passage 123 decreases within the warming-up rotational range RGc. The EGR valve body 14 does not increase the opening degree of the downstream passage 123 by rotating to one side in the EGR valve circumferential direction Dac within the warming-up rotational range RGc. Conversely, as the EGR valve body 14 rotates to the other side in the EGR valve circumferential direction Dac, the opening degree of the downstream passage 123 decreases within the after-warm-up rotational range RGh. The EGR valve body 14 does not increase the opening degree of the downstream passage 123 by rotating to the other side in the EGR valve circumferential direction Dac within the after-warm-up rotational range RGh.

The EGR valve body 14 is in an attitude along the first passage direction D1 both at a rotational position at which the EGR valve body 14 is rotated 90 degrees from the reference rotational position Nr to one side in the EGR valve circumferential direction Dac and at a rotational position at which the EGR valve body 14 is rotated 90 degrees from the reference rotational position Nr to the other side in the EGR valve circumferential direction Dac.

The EGR valve body 14 thus fully opens the downstream passage 123 at either the rotational position at which the EGR valve body 14 is rotated 90 degrees from the reference rotational position Nr to one side in the EGR valve circumferential direction Dac or the rotational position at which the EGR valve body 14 is rotated 90 degrees from the reference rotational position Nr to the other side in the EGR valve circumferential direction Dac. In both the case where the EGR valve body 14 rotates within the warming-up rotational range RGc and the case where the EGR valve body 14 rotates within the after-warm-up rotational range RGh, the opening degree of the downstream passage 123 increases as the rotation amount of the EGR valve body 14 rotated from the reference rotational position Nr increases. Specifically, the relationship between the rotation amount (in other words, the rotation angle) of the EGR valve body 14 from the reference rotational position Nr and the opening degree of the downstream passage 123 is the same in the case where the EGR valve body 14 rotates within the warming-up rotational range RGc and the case where the EGR valve body 14 rotates within the after-warm-up rotational range RGh.

For example, in the present embodiment, in a case where the EGR valve body 14 is at the reference rotational position Nr, both the second upstream passage 122 and the downstream passage 123 are fully closed as illustrated in (b) in FIG. 6. In both the warming-up rotational range RGc and the after-warm-up rotational range RGh, the larger the opening degree of the downstream passage 123, the larger the opening degree of the second upstream passage 122. In (b) in FIG. 6, the EGR opening is the opening degree of the downstream passage 123, and the bypass opening is the opening degree of the second upstream passage 122.

However, in a case when the EGR valve body 14 is rotated within the warming-up rotational range RGc, when the EGR valve body 14 fully opens the downstream passage 123, the bypass valve body 20 fully opens the second upstream passage 122. On the other hand, in a case when the EGR valve body 14 is rotated within the after-warm-up rotational range RGh, when the EGR valve body 14 fully opens the downstream passage 123, the bypass valve body 20 does not fully open the second upstream passage 122 but keeps the opening degree smaller than a fully open state.

As described above, the passage opening degree characteristic that is the relationship between the opening degree of the second upstream passage 122 and the opening degree of the downstream passage 123 that change in an interlocking manner with each other is different between the case where the EGR valve body 14 rotates within the warming-up rotational range RGc and the case where the EGR valve body 14 rotates within the after-warm-up rotational range RGh. This is because, as illustrated in FIG. 2, the shape of the portion of the cam track 291 along which the roller 302 of the driven rotating portion 30 runs is different between the case where the EGR valve body 14 rotates from the reference rotational position Nr to one side in the EGR valve circumferential direction Dac and the case where the EGR valve body 14 rotates to the other side in the EGR valve circumferential direction Dac.

Figure 7:
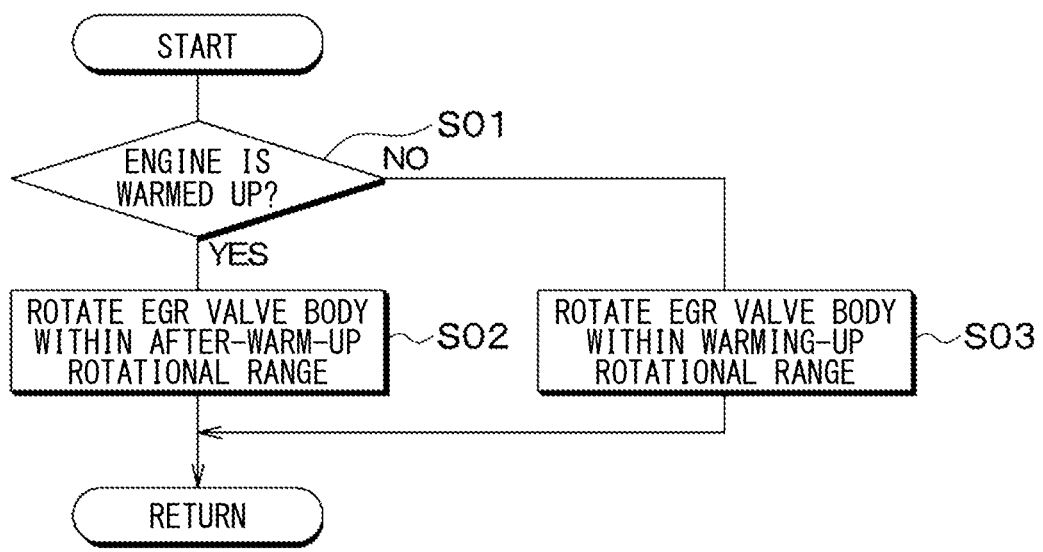
FIG. 7 is a flowchart illustrating a control process of an EGR control unit illustrated in FIG. 1 in the first embodiment.

Next, the control process performed by the EGR control unit 851 of the present embodiment will be described with reference to FIG. 7. FIG. 7 is a flowchart illustrating the control process of the EGR control unit 851. The flowchart of FIG. 7 is performed periodically and repeatedly during the operation of the engine 71.

As illustrated in FIG. 7, the EGR control unit 851 first determines in step S01 whether the engine 71 is warming up or has warmed up. The state where the engine 71 is warming up means a state where the engine 71 is operating and the warm-up of the engine 71 is not completed, and the state after the warm-up of the engine 71 means a state where the engine 71 is operating and the warm-up of the engine 71 is completed.

Specifically, the EGR control unit 851 in FIG. 1 receives a detection signal from a water temperature sensor 86 that detects the temperature of engine cooling water for cooling the engine 71. If the temperature of the engine cooling water is equal to or higher than a predetermined warm-up determination value, the EGR control unit 851 determines that the engine 71 has warmed up.

Conversely, if the temperature of the engine cooling water is less than the predetermined warm-up determination value, the EGR control unit 851 determines that the engine 71 is warming up. The warm-up determination value is experimentally set in advance, for example, so that it can be determined whether the engine 71 is warming up or has warmed up. The warm-up determination value may be changed depending on the outside air temperature.

If it is determined in step S01 of FIG. 7 that the engine 71 has warmed up, the process proceeds to step S02. On the other hand, if it is determined that the engine 71 is warming up, the process proceeds to step S03.

In step S02, the EGR control unit 851 controls the motor 24 to rotate the EGR valve body 14 within the after-warm-up rotational range RGh. In step S03, the EGR control unit 851 controls the motor 24 to rotate the EGR valve body 14 within the warming-up rotational range RGc.

For example, in any of steps S02 and S03, the EGR control unit 851 determines the rotation amount of the EGR valve body 14 from the reference rotational position Nr on the basis of the load of the engine 71 or the like. The EGR control unit 851 then operates the motor 24 so that the attitude of the EGR valve body 14 matches the determined rotation amount of the EGR valve body 14.

The processes in the steps of FIG. 7 described above each constitute a functional unit that implements each function, and the EGR control unit 851 includes these functional units.

In the valve device 10 configured as described above, as illustrated in FIGS. 2 to 5, when the motor 24 is energized to rotate the motor shaft 242, the rotation of the motor shaft 242 is transmitted to the EGR valve shaft 15 via the speed reduction device 26, and the EGR valve shaft 15 rotates. The EGR valve body 14 and the cam 29 thus rotate around the EGR valve axis CLa integrally with the EGR valve shaft 15. At this time, in a case where the engine 71 is warming up, the EGR control unit 851 rotates the EGR valve body 14 within the warming-up rotational range RGc, and in a case where the engine 71 has warmed up, rotates the EGR valve body 14 within the after-warm-up rotational range RGh.

The opening degree of the downstream passage 123 is changed by the rotation of the EGR valve body 14. When the cam 29 rotates, the lever 301 of the driven rotating portion 30 rotates in an interlocking manner with the rotational operation of the cam 29 while causing the roller 302 to follow the cam track 291. The bypass valve body 20 and the bypass valve shaft 21 thus rotate around the bypass valve axis CLb integrally with the lever 301. The opening degree of the second upstream passage 122 is changed by the rotation of the bypass valve body 20.

Next, operations and effects exhibited in the present embodiment will be described. As described above, according to the present embodiment, as illustrated in FIGS. 5 and 6, the EGR valve body 14 is controlled by the EGR control unit 851 to rotate within the warming-up rotational range RGc during the warm-up of the engine 71. As the EGR valve body 14 rotates to one side in the EGR valve circumferential direction Dac, the opening degree of the downstream passage 123 decreases within the warming-up rotational range RGc. In a case where the one side end 141 or the other side end 142 of the EGR valve body 14 is located on the gas-flow upstream side of the side edge B2a in FIG. 5, as the EGR valve body 14 rotates to one side in the EGR valve circumferential direction Dac, the upstream side end of the EGR valve body 14 is moved away from the second upstream passage 122. The upstream side end of the EGR valve body 14 is a side end located on the gas-flow upstream side of the side edge B2a, among the one side end 141 and the other side end 142 of the EGR valve body 14.

Figure 8:
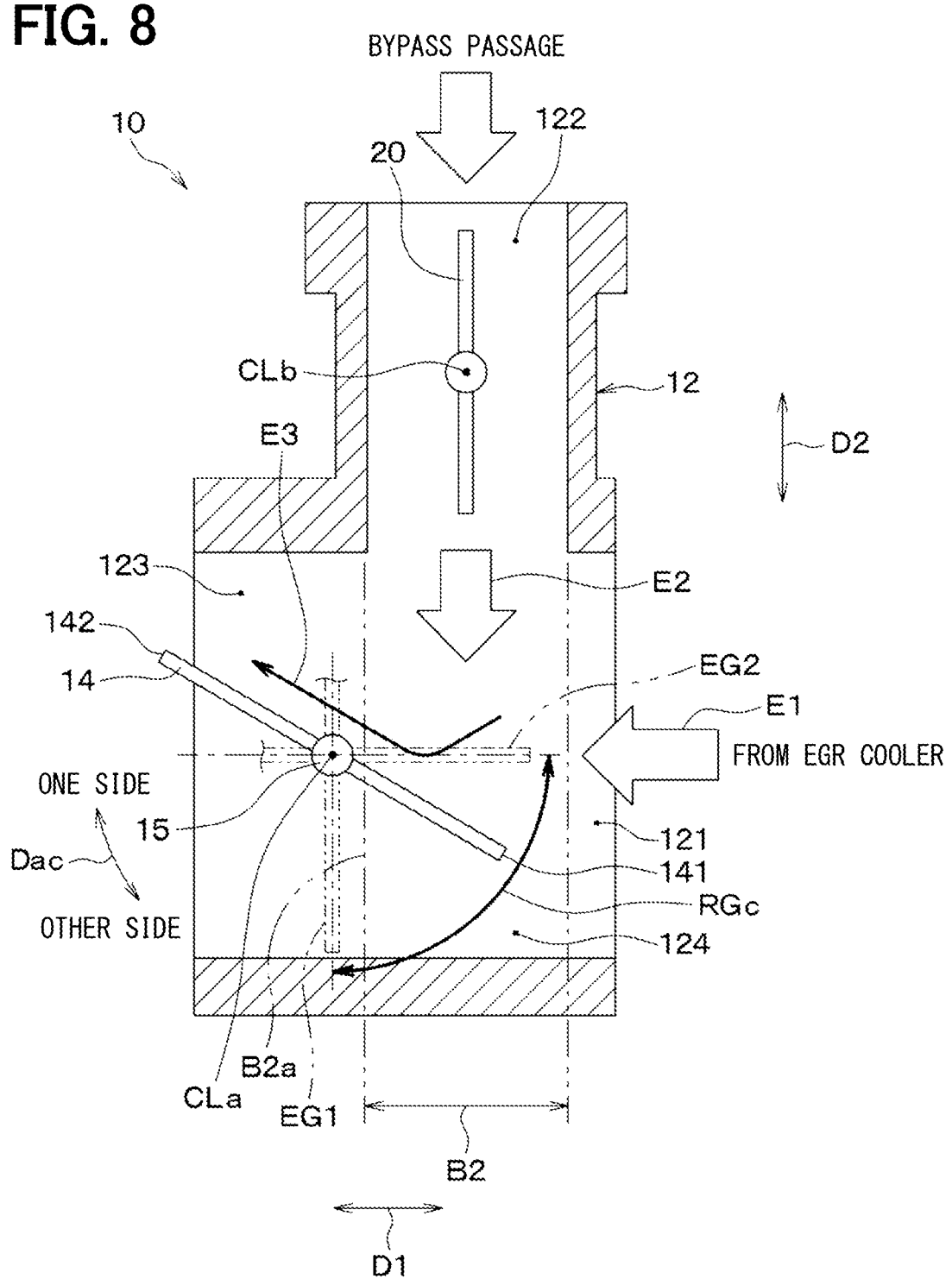
FIG. 8 is a schematic cross-sectional view illustrating a state where the EGR valve body is at a rotational position within the warming-up rotational range during the warm-up of the engine in the first embodiment, and corresponding to FIG. 5.

With such a configuration, as illustrated in FIG. 8, the EGR valve body 14 hardly prevents the mixing of the EGR gas flowing from the first upstream passage 121 as indicated by an arrow E1 and the EGR gas flowing from the second upstream passage 122 as indicated by an arrow E2 over the entire warming-up rotational range RGc. The EGR gas cooled by the EGR cooler 80 and flowing from the first upstream passage 121 is mixed with the EGR gas bypassing the EGR cooler 80 and flowing from the second upstream passage 122 to rise in temperature, and then flows as indicated by an arrow E3 to hit the EGR valve body 14.

As a result, it is possible to suppress generation of condensed water due to high-humidity EGR gas hitting the low-temperature EGR valve body 14. As the EGR valve body 14 is disposed to be shifted to the gas-flow upstream side in the downstream passage 123 so as to reduce the interval between the EGR valve body 14 and the bypass valve body 20 while the generation of condensed water is suppressed, the valve device 10 can be downsized. A two-dot chain line EG1 in FIG. 8 indicates a part of the EGR valve body 14 in a state where the downstream passage 123 is fully closed within the warming-up rotational range RGc, and a two-dot chain line EG2 indicates a part of the EGR valve body 14 in a state where the downstream passage 123 is fully opened within the warming-up rotational range RGc.

Figure 9:
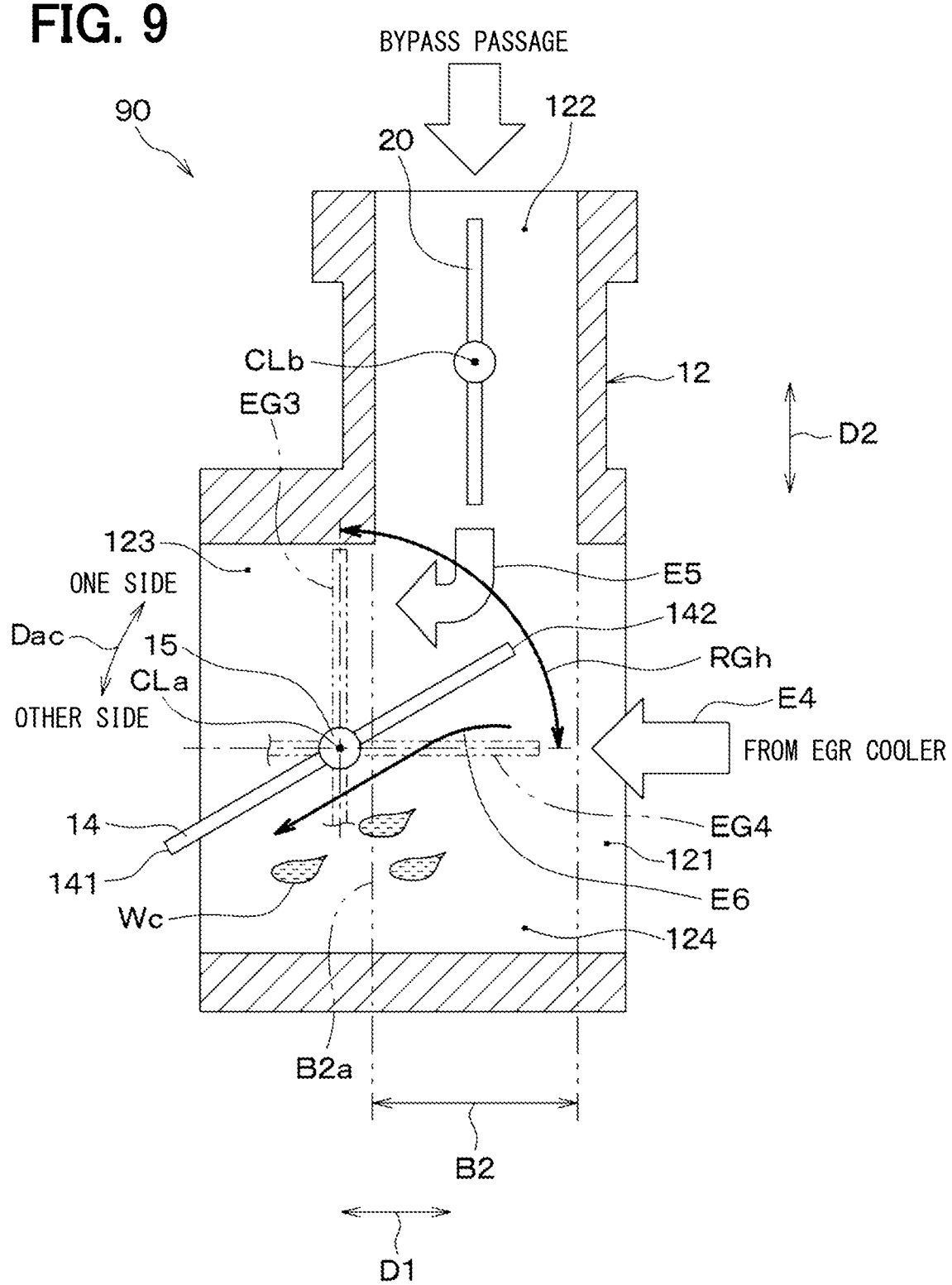
FIG. 9 is a schematic cross-sectional view illustrating a state where the EGR valve body is at a rotational position out of the warming-up rotational range during the warm-up of the engine in a first comparative example, and corresponding to FIG. 8.

Here, in order to explain the reason why the generation of condensed water is suppressed in the present embodiment, a first comparative example illustrated in FIG. 9 is used. In a valve device 90 of the first comparative example, as illustrated in FIG. 9, the EGR valve body 14 is rotated within a rotational range (for example, within the after-warm-up rotational range RGh) out of the warming-up rotational range RGc during the warm-up of the engine 71. The first comparative example is similar to the present embodiment except for this point. A two-dot chain line EG3 in FIG. 9 indicates a part of the EGR valve body 14 in a state where the downstream passage 123 is fully closed within the after-warm-up rotational range RGh, and a two-dot chain line EG4 indicates a part of the EGR valve body 14 in a state where the downstream passage 123 is fully opened within the after-warm-up rotational range RGh.

In the first comparative example, as illustrated in FIG. 9, the EGR valve body 14 is likely to be in an attitude that prevents the EGR gas cooled by the EGR cooler 80 and flowing as indicated by an arrow E4 from being mixed with the EGR gas bypassing the EGR cooler 80 and flowing as indicated by an arrow E5 during the warm-up of the engine 71. In many cases, the EGR gas cooled by the EGR cooler 80 thus flows as indicated by an arrow E6 with almost no temperature rise and hits the EGR valve body 14. The EGR gas flowing out of the EGR cooler 80 during the warm-up of the engine 71 may have a low temperature equal to or lower than the dew point temperature or may be close to the dew point temperature. In the first comparative example, in a state where the EGR valve body 14 is not sufficiently warmed during the warm-up of the engine 71, the EGR gas with the dew point temperature or lower or a temperature near the dew point temperature hits the EGR valve body 14, so that condensed water We is likely to be generated on the surface of the EGR valve body 14.

On the other hand, in the present embodiment, as described above, it is possible to suppress generation of condensed water due to the high-humidity EGR gas hitting the low-temperature EGR valve body 14 during the warm-up of the engine 71, as compared with the first comparative example.

Figure 10:
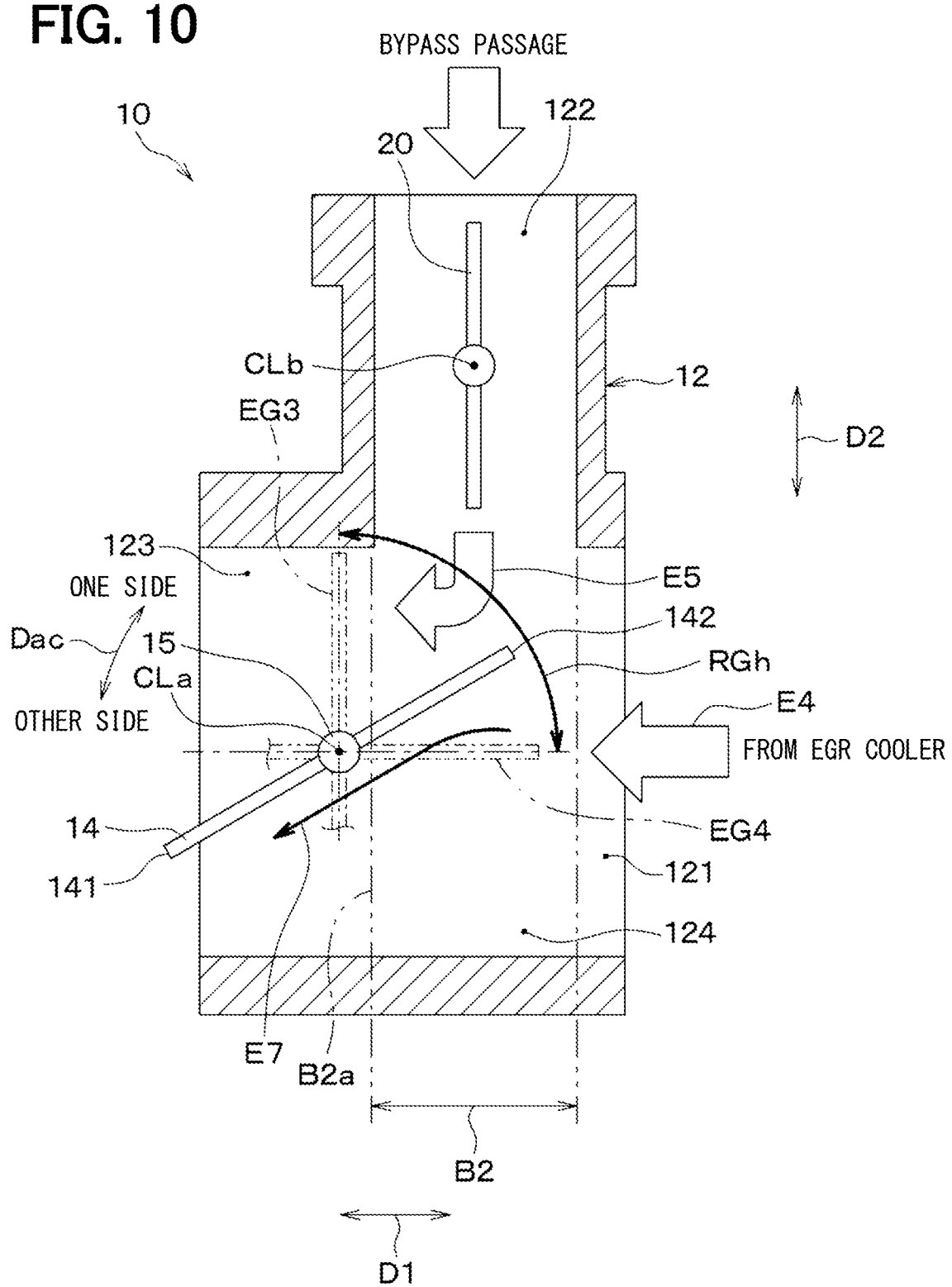
FIG. 10 is a schematic cross-sectional view illustrating a state where the EGR valve body is at a rotational position within the after-warm-up rotational range after the warm-up of the engine in the first embodiment, and corresponding to FIG. 8.

Also in the present embodiment, as illustrated in FIG. 10, the EGR valve body 14 may be rotated within the after-warm-up rotational range RGh. In this case, similarly to the first comparative example, the EGR valve body 14 is likely to be in an attitude that prevents the EGR gas cooled by the EGR cooler 80 and flowing as indicated by the arrow E4 from being mixed with the EGR gas bypassing the EGR cooler 80 and flowing as indicated by the arrow E5. However, in the present embodiment, the EGR valve body 14 is rotated within the after-warm-up rotational range RGh not during the warm-up of the engine 71 but after the warm-up of the engine 71.

Since the temperature of the EGR gas flowing from the first upstream passage 121 as indicated by the arrow E4 is not as low as the temperature during the warm-up of the engine 71, even if the EGR gas flows as indicated by an arrow E7 without being heated and hits the EGR valve body 14, the EGR valve body 14 is not cooled until the temperature becomes low enough to generate condensed water. The EGR valve body 14 is also warmed after the warm-up of the engine 71, and thus there is no generation of condensed water due to the high-humidity EGR gas hitting the low-temperature EGR valve body 14.

(1) According to the present embodiment, as illustrated in FIGS. 5 and 6, as the EGR valve body 14 rotates to the other side in the EGR valve circumferential direction Dac, the opening degree of the downstream passage 123 decreases within the after-warm-up rotational range RGh. When the EGR valve body 14 is at the reference rotational position Nr, which is the rotational position at the boundary between the warming-up rotational range RGc and the after-warm-up rotational range RGh, the EGR valve body 14 fully closes the downstream passage 123. The relationship between the rotation amount of the EGR valve body 14 from the reference rotational position Nr and the opening degree of the downstream passage 123 is the same in the case where the EGR valve body 14 rotates within the warming-up rotational range RGc and the case where the EGR valve body 14 rotates within the after-warm-up rotational range RGh. The passage opening degree characteristic that is the relationship between the opening degree of the second upstream passage 122 and the opening degree of the downstream passage 123 that change in an interlocking manner with each other is different between the case where the EGR valve body 14 rotates within the warming-up rotational range RGc and the case where the EGR valve body 14 rotates within the after-warm-up rotational range RGh.

Therefore, it is possible to selectively use two types of passage opening degree characteristics depending on whether the engine 71 is warming up or has warmed up while generation of condensed water due to the EGR gas hitting the EGR valve body 14 is avoided.

(2) According to the present embodiment, as illustrated in FIGS. 2 and 3, the interlocking portion 28 includes the cam 29 that rotates together with the EGR valve body 14 and includes the cam track 291, and the driven rotating portion 30 that rotates together with the bypass valve body 20 and includes the roller 302. The driven rotating portion 30 rotates in an interlocking manner with the rotational operation of the cam 29 while causing the roller 302 to follow the cam track 291.

It is thus easy to interlock the EGR valve body 14 with the bypass valve body 20 depending on the shape of the cam track 291 so that the rotation amount of the EGR valve body 14 and the rotation amount of the bypass valve body 20 have a non-linear relationship, for example. Therefore, the degree of freedom in setting the passage opening degree characteristic can be increased.

Second Embodiment

Next, a second embodiment will be described. The present embodiment will mainly describe differences from the first embodiment. In addition, the same or equivalent parts as those in the embodiment described above will be omitted or simplified. The same applies to the description of embodiments to be described later.

Figure 11:
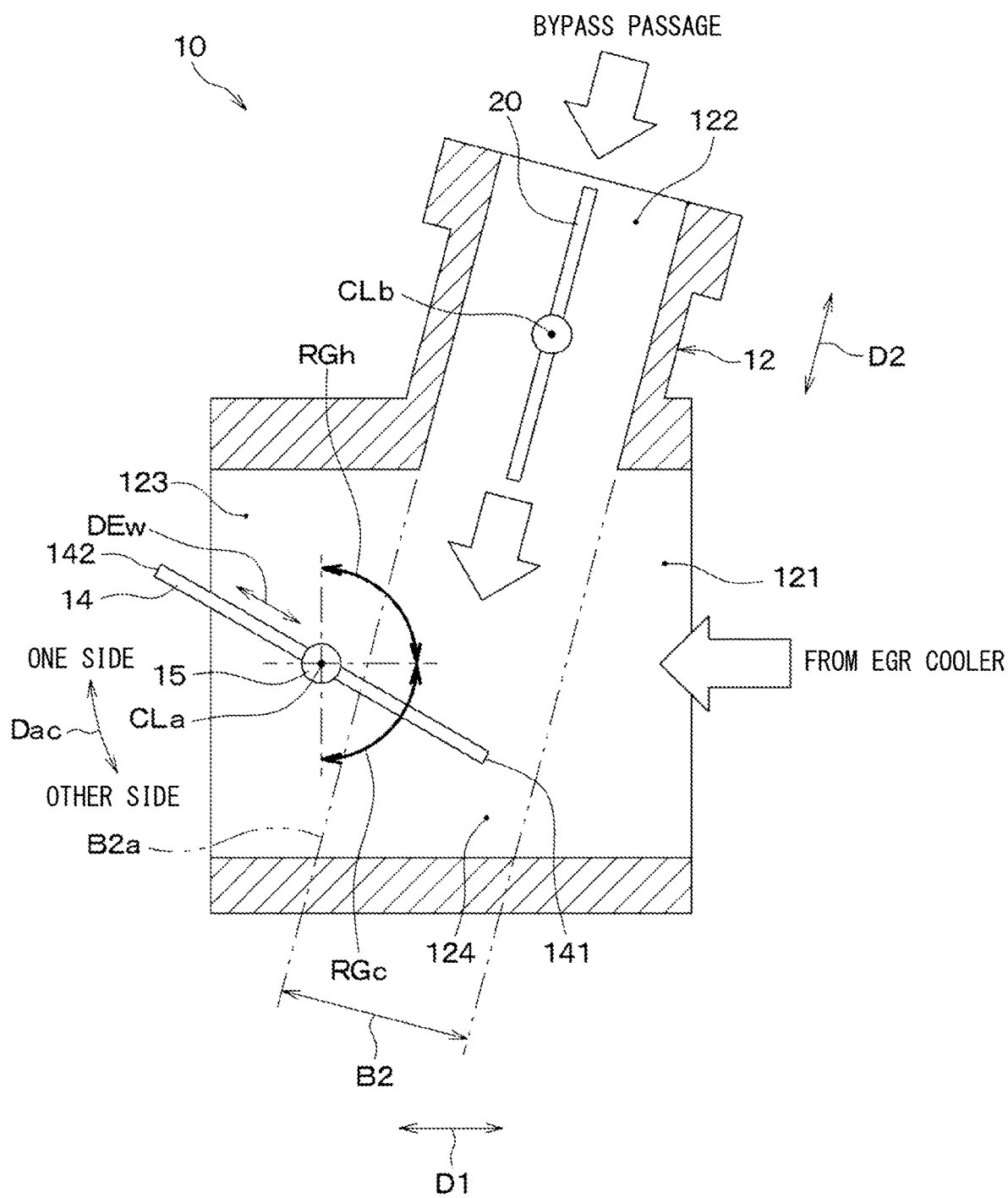
FIG. 11 is a partial cross-sectional view schematically illustrating a valve device with an interlocking portion, a motor, and the vicinity thereof omitted in a second embodiment, and corresponding to FIG. 5.

As illustrated in FIG. 11, the second upstream passage 122 of the present embodiment is a passage linearly extending along the second passage direction D2, and the second passage direction D2 is a direction intersecting the first passage direction D1. However, unlike the first embodiment, the second passage direction D2 is not perpendicular to the first passage direction D1.

Specifically, the second passage direction D2 is inclined with respect to the first passage direction D1 so that the gas-flow upstream side of the second upstream passage 122 is provided, with respect to the gas-flow downstream side, on the gas-flow upstream side of the first upstream passage 121 in the first passage direction D1.

The reference rotational position Nr of the EGR valve body 14 in the present embodiment is the same as that in the first embodiment. The warming-up rotational range RGc and the after-warm-up rotational range RGh in the present embodiment are also the same as those in the first embodiment.

The present embodiment is similar to the first embodiment except for the above description. In the present embodiment, the same effects as those of the first embodiment can be obtained from the same configuration as that of the first embodiment.

Third Embodiment

Next, a third embodiment will be described. The present embodiment will mainly describe differences from the first embodiment.

Figure 12:
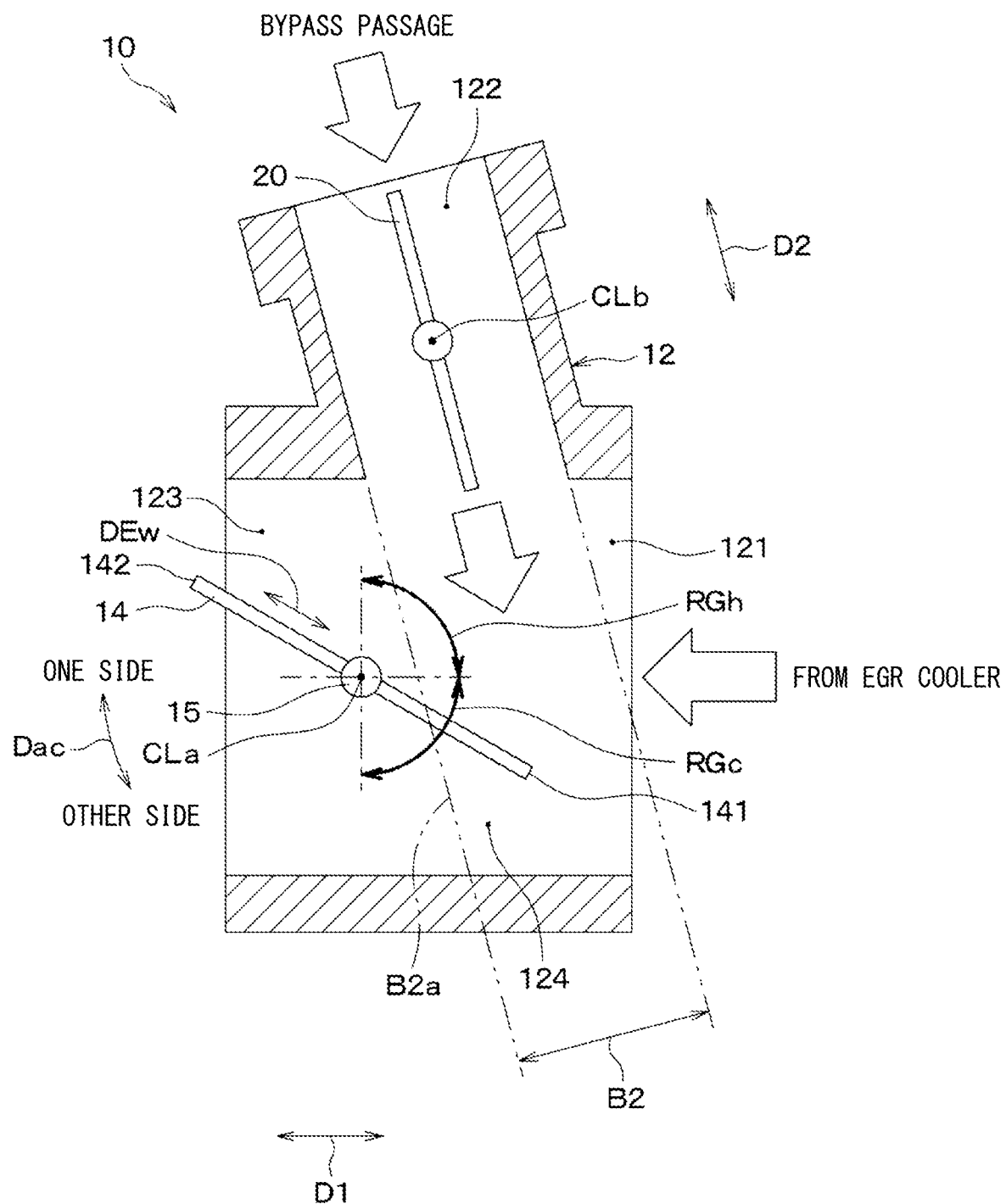
FIG. 12 is a partial cross-sectional view schematically illustrating a valve device with an interlocking portion, a motor, and the vicinity thereof omitted in a third embodiment, and corresponding to FIG. 5.

As illustrated in FIG. 12, the second upstream passage 122 of the present embodiment is a passage linearly extending along the second passage direction D2, and the second passage direction D2 is a direction intersecting the first passage direction D1. However, unlike the first embodiment, the second passage direction D2 is not perpendicular to the first passage direction D1.

Specifically, the second passage direction D2 is inclined with respect to the first passage direction D1 so that the gas-flow upstream side of the second upstream passage 122 is provided, with respect to the gas-flow downstream side, on the gas-flow downstream side of the first upstream passage 121 in the first passage direction D1.

The reference rotational position Nr of the EGR valve body 14 in the present embodiment is the same as that in the first embodiment. The warming-up rotational range RGc and the after-warm-up rotational range RGh in the present embodiment are also the same as those in the first embodiment.

The present embodiment is similar to the first embodiment except for the above description. In the present embodiment, the same effects as those of the first embodiment can be obtained from the same configuration as that of the first embodiment.

Fourth Embodiment

Next, a fourth embodiment will be described. The present embodiment will mainly describe differences from the first embodiment.

Figure 13:
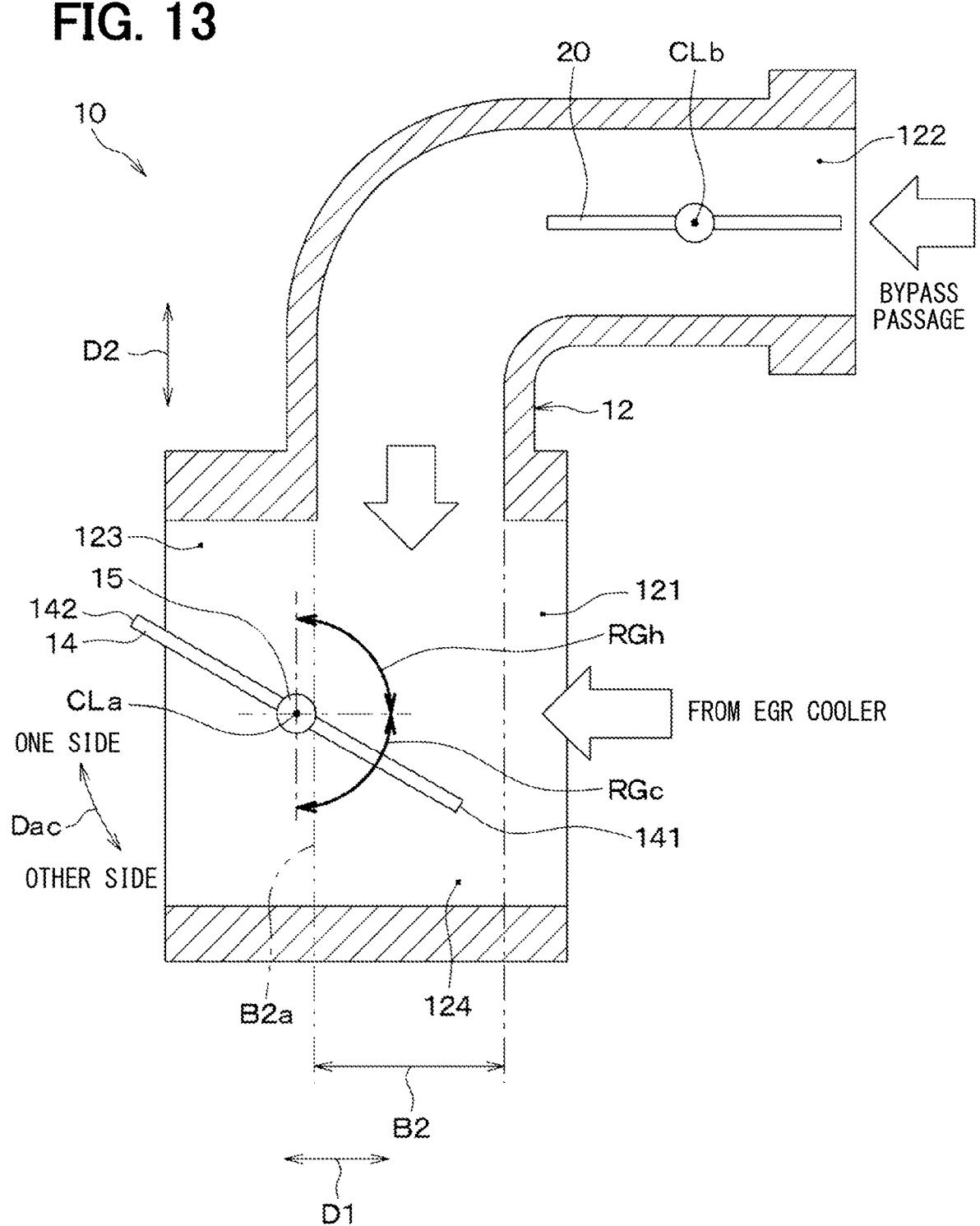
FIG. 13 is a partial cross-sectional view schematically illustrating a valve device with an interlocking portion, a motor, and the vicinity thereof omitted in a fourth embodiment, and corresponding to FIG. 5.

As illustrated in FIG. 13, the second upstream passage 122 of the present embodiment does not linearly extend along the second passage direction D2, and is a curved passage.

Specifically, the second upstream passage 122 extends in a direction intersecting the second passage direction D2 on the gas-flow upstream side of the second upstream passage 122. The second upstream passage 122 linearly extends along the second passage direction D2 on the gas-flow downstream side including the downstream end in the second upstream passage 122. In the present embodiment, since the extended space B2 is virtually extended from the downstream end of the second upstream passage 122, it is similar to that in the first embodiment.

The reference rotational position Nr of the EGR valve body 14 in the present embodiment is the same as that in the first embodiment. The warming-up rotational range RGc and the after-warm-up rotational range RGh in the present embodiment are also the same as those in the first embodiment.

The present embodiment is similar to the first embodiment except for the above description. In the present embodiment, the same effects as those of the first embodiment can be obtained from the same configuration as that of the first embodiment.

Fifth Embodiment

Next, a fifth embodiment will be described. The present embodiment will mainly describe differences from the first embodiment.

Figure 14:
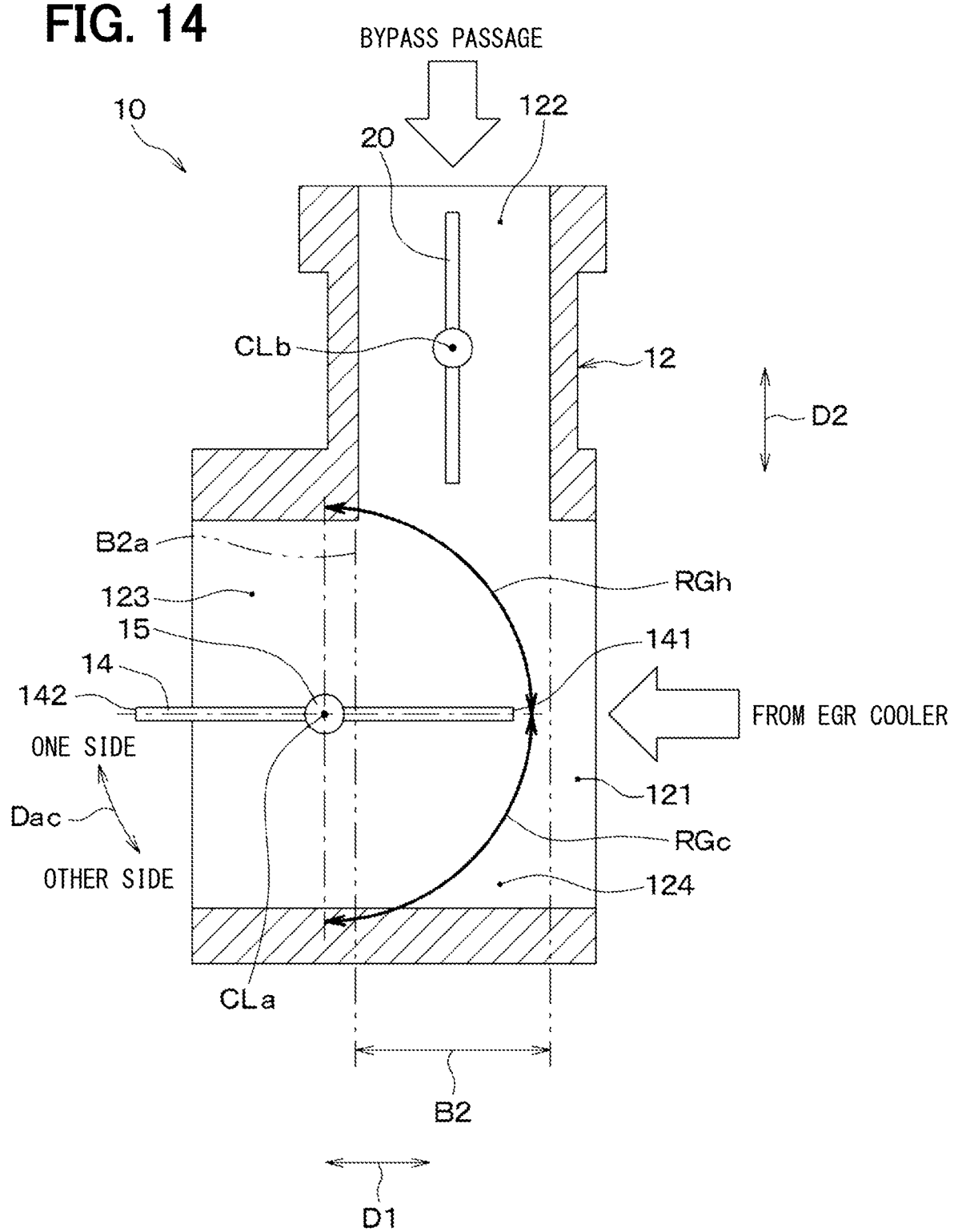
FIG. 14 is a partial cross-sectional view schematically illustrating a valve device with an interlocking portion, a motor, and the vicinity thereof omitted in a fifth embodiment, and corresponding to FIG. 5.

As illustrated in FIG. 14, the warming-up rotational range RGc and the after-warm-up rotational range RGh in the present embodiment are the same as those in the first embodiment. However, in the present embodiment, the reference rotational position Nr of the EGR valve body 14, which is the rotational position at the boundary between the warming-up rotational range RGc and the after-warm-up rotational range RGh, is a rotational position at which the EGR valve body 14 fully opens the downstream passage 123. That is, when the EGR valve body 14 is at the reference rotational position Nr, the downstream passage 123 is fully opened. FIG. 14 illustrates the EGR valve body 14 at the reference rotational position Nr.

The attitude of the EGR valve body 14 at a fully-closed rotational position within the warming-up rotational range RGc is rotated by 180 degrees around the EGR valve axis CLa from the attitude of the EGR valve body 14 at a fully-closed rotational position within the after-warm-up rotational range RGh.

The present embodiment is similar to the first embodiment except for the above description. In the present embodiment, the same effects as those of the first embodiment can be obtained from the same configuration as that of the first embodiment.

Although the present embodiment is a modification based on the first embodiment, the present embodiment can be combined with any of the second to fourth embodiments described above.

Sixth Embodiment

Next, a sixth embodiment will be described. The present embodiment will mainly describe differences from the first embodiment.

Figure 15:
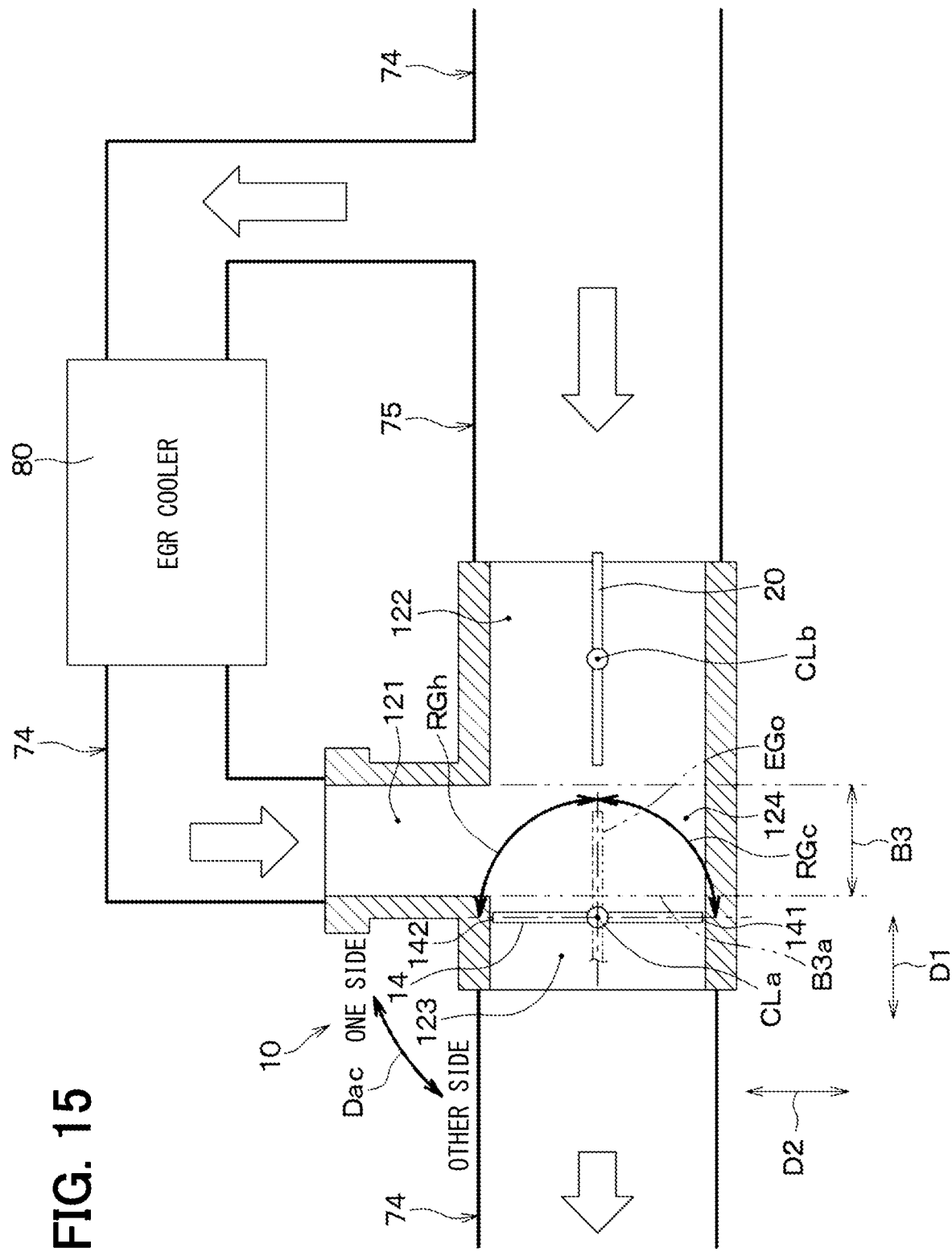
FIG. 15 is a diagram illustrating an EGR cooler, a bypass passage, and a valve device in extracted manner and illustrating the valve device in a schematic cross-section in a sixth embodiment.

As illustrated in FIG. 15, the present embodiment is different from the first embodiment in the arrangement of the first upstream passage 121, the second upstream passage 122, and the bypass valve body 20. The reference rotational position Nr of the EGR valve body 14 in the present embodiment is the same as that in the first embodiment. The warming-up rotational range RGc and the after-warm-up rotational range RGh in the present embodiment are also the same as those in the first embodiment.

Specifically, in the present embodiment, the second upstream passage 122, the junction 124, and the downstream passage 123 are connected in series from the gas-flow upstream side in the order of the second upstream passage 122, the junction 124, and the downstream passage 123 along the first passage direction D1, and form one linearly extending passage. That is, the direction of the second upstream passage 122 and the direction of the downstream passage 123 are the same, and both are the first passage direction D1. The second upstream passage 122 is connected in series to the downstream passage 123 via the junction 124.

The first upstream passage 121 linearly extends along the second passage direction D2. That is, the direction of the first upstream passage 121 is the second passage direction D2, and the first upstream passage 121 is disposed in a direction intersecting the second upstream passage 122 and the downstream passage 123. The first upstream passage 121 is connected to the downstream passage 123 via the junction 124. Also in the present embodiment, the second passage direction D2 is a direction intersecting the first passage direction D1, strictly speaking, a direction perpendicular to the first passage direction D1, as in the first embodiment.

The bypass valve body 20 of the present embodiment is disposed in the second upstream passage 122 and rotates around the bypass valve axis CLb parallel to the EGR valve axis CLa, as in the first embodiment. The bypass valve axis CLb, which is the rotation center of the bypass valve body 20, is arranged side by side in the first passage direction D1 with the EGR valve axis CLa, which is the rotation center of the EGR valve body 14. The bypass valve shaft 21 is also arranged side by side with the EGR valve shaft 15 in the first passage direction D1.

An extended space B3 is assumed. The extended space B3 is obtained by virtually extending the first upstream passage 121 along the direction of the first upstream passage 121 (that is, the second passage direction D2). In this case, in a state where the EGR valve body 14 fully opens the downstream passage 123, the one side end 141 or the other side end 142 of the EGR valve body 14 is located on the gas-flow upstream side of a side edge B3a of the extended space B3 on the side of the downstream passage 123.

The two-dot chain line EGo in FIG. 15 also indicates a part of the EGR valve body 14 in a fully open state of the downstream passage 123, similarly to FIG. 5. In the present embodiment, the first upstream passage 121 corresponds to the other passage of the present disclosure, and the second upstream passage 122 corresponds to one passage of the present disclosure.

Also in the present embodiment, the EGR valve body 14 hardly prevents the mixing of the EGR gas flowing from the first upstream passage 121 to the junction 124 and the EGR gas flowing from the second upstream passage 122 to the junction 124 over the entire warming-up rotational range RGc, as in the first embodiment. As a result, it is possible to suppress generation of condensed water due to the high-humidity EGR gas hitting the cooled EGR valve body 14 during the warm-up of the engine 71.

The present embodiment is similar to the first embodiment except for the above description. In the present embodiment, the same effects as those of the first embodiment can be obtained from the same configuration as that of the first embodiment.

Although the present embodiment is a modification based on the first embodiment, the present embodiment can be combined with any of the second to fifth embodiments described above.

Other Embodiments (1) In each of the embodiments described above, the fuel used in the internal combustion engine system 70 illustrated in FIG. 1 is hydrogen, but this is an example. The internal combustion engine system 70 may use, for example, fossil fuel such as gasoline as fuel for generating power.

(2) In the first embodiment described above, as illustrated in FIG. 2, the cam track 291 includes a part of the peripheral edge of the cam 29, but may include, for example, a groove or a long hole provided in the cam 29 instead of the peripheral edge of the cam 29.

(3) In the first embodiment described above, as illustrated in FIG. 5, the warming-up rotational range RGc is set to be the same as the other side range that is the rotation range from the fully-closed rotational position of the EGR valve body 14 to a rotational position at which the EGR valve body 14 is rotated 90 degrees to the other side in the EGR valve circumferential direction Dac, but this is an example. For example, it is only required that the entire warming-up rotational range RGc is included in the other side range, and the warming-up rotational range RGc may be a rotation range of the EGR valve body 14 narrower than the other side range.

The same applies to the after-warm-up rotational range RGh. That is, it is only required that the entire after-warm-up rotational range RGh is included in a one side range that is a rotation range from the fully-closed rotational position of the EGR valve body 14 to a rotational position at which the EGR valve body 14 rotates 90 degrees to one side in the EGR valve circumferential direction Dac. The after-warm-up rotational range RGh may be a rotation range of the EGR valve body 14 narrower than the one side range.

(4) In each of the embodiments described above, in step S01 of FIG. 7, whether or not the engine 71 has warmed up is determined on the basis of, for example, the temperature of engine cooling water detected by the water temperature sensor 86, but may be determined on the basis of information other than the temperature of the engine cooling water. For example, whether or not the engine 71 has warmed up may be determined on the basis of the elapsed time from the start of the engine 71.

(5) In each of the embodiments described above, as illustrated in FIG. 2, the interlocking portion 28 is configured as a cam link mechanism, but may be configured as a mechanical mechanism other than the cam link mechanism. For example, the interlocking portion 28 may be configured as a gear link mechanism that connects the EGR valve shaft 15 and the bypass valve shaft 21 so as to be capable of transmitting power via a plurality of gears meshed with each other.

(6) In each of the embodiments described above, as illustrated in FIGS. 2 and 3, the bypass valve body 20 is a butterfly valve body, but may be a valve body of another type. For example, the bypass valve body 20 may be a disk valve body with a flat plate shape, and may slide to open and close the second upstream passage 122.

(7) In each of the embodiments described above, the EGR control unit 851 that controls the valve device 10 is included in the control device 85 that functions as an engine control device, but this is an example. For example, the EGR control unit 851 may be configured as a control device independent of the control device 85 as the engine control device.

(8) In each of the embodiments described above, the processes of the individual steps illustrated in the flowchart of FIG. 7 are each implemented by a computer program, but may be implemented by hardware.

(9) The present disclosure is not limited to the embodiments described above, and various modifications can be made. In addition, the embodiments described above are not unrelated to each other, and can be appropriately combined unless the combination is obviously impossible.

In addition, in each of the above embodiments, it goes without saying that the elements constituting the embodiments are not necessarily essential except for a case where it is explicitly stated that the elements are particularly essential and a case where the elements are considered to be obviously essential in principle. In each of the above embodiments, when a numerical value such as the number, numerical value, amount, range, or the like of the constituent elements of the embodiment is mentioned, the numerical value is not limited to a specific number unless otherwise specified as essential or obviously limited to the specific number in principle.

In each of the above embodiments, when the material, shape, positional relationship, and the like of the constituent elements and the like are referred to, the material, the shape, the positional relationship, and the like are not limited unless otherwise specified or limited to specific materials, shapes, positional relationships, and the like in principle.

The EGR control unit 851 and the method thereof described in the present disclosure may be implemented by a dedicated computer provided by configuring a processor and a memory programmed to perform one or a plurality of functions embodied by a computer program. Alternatively, the EGR control unit 851 and the method thereof described in the present disclosure may be implemented by a dedicated computer provided by configuring a processor with one or more dedicated hardware logic circuits. Alternatively, the EGR control unit 851 and the method thereof described in the present disclosure may be implemented by one or more dedicated computers configured by a combination of a processor and a memory programmed to perform one or a plurality of functions and a processor configured with one or more hardware logic circuits. The computer program may be stored in a computer-readable non-transition tangible recording medium as an instruction performed by a computer.

What is claimed is:

1. A valve device that increases or decreases a flow rate of EGR gas, the valve device comprising:
 a housing that includes
  a first upstream passage into which the EGR gas cooled by an EGR cooler flows,
  a second upstream passage into which the EGR gas that bypasses the EGR cooler flows,
  a junction connected to each of a gas-flow downstream side of the first upstream passage and a gas-flow downstream side of the second upstream passage, and
  a downstream passage connected to the first upstream passage and the second upstream passage via the junction;
 a bypass valve body that opens and closes the second upstream passage;
 an EGR valve body that is provided in the downstream passage, rotates around an EGR valve axis, is controlled to rotate within a warming-up rotational range, which is predetermined, during warm-up of an engine, and reduces an opening degree of the downstream passage as the EGR valve body rotates to one side in a circumferential direction of the EGR valve axis within the warming-up rotational range; and an interlocking portion that interlocks the bypass valve body with a rotational operation of the EGR valve body, wherein one of the first upstream passage and the second upstream passage is connected in series to the downstream passage via the junction in a same direction as a direction of the downstream passage, an other of the first upstream passage and the second upstream passage is connected to the downstream passage via the junction in a direction intersecting the direction of the downstream passage, and is defined as an other passage, the EGR valve body has a one side end provided on one side in a valve body lateral direction that is perpendicular to the EGR valve axis and is a direction toward which the EGR valve body is extended, and an other side end provided on an other side in the valve body lateral direction, in a state where the EGR valve body fully opens the downstream passage, the one side end or the other side end is located upstream with respect to a side edge that is an edge of an extended space and a closest edge to the downstream passage, the extended space is obtained by virtually extending the other passage toward a direction of the other passage, in a case where the one side end or the other side end is located upstream with respect to the side edge, as the EGR valve body rotates to the one side in the circumferential direction, an upstream side end located upstream with respect to the side edge, among the one side end and the other side end, is moved away from the other passage.

2. The valve device according to claim 1, wherein the EGR valve body is controlled to rotate within an after-warm-up rotational range, which is predetermined, following the warming-up rotational range after the warm-up of the engine, the EGR valve body reduces the opening degree of the downstream passage as the EGR valve body rotates to an other side opposite to the one side in the circumferential direction within the after-warm-up rotational range, the EGR valve body fully closes or fully opens the downstream passage when the EGR valve body is at a rotational position at a boundary between the warming-up rotational range and the after-warm-up rotational range, a relationship between a rotation amount of the EGR valve body from the rotational position at the boundary and the opening degree of the downstream passage is a same in a case where the EGR valve body rotates within the warming-up rotational range and a case where the EGR valve body rotates within the after-warm-up rotational range, and a relationship between an opening degree of the second upstream passage and the opening degree of the downstream passage that change in an interlocking manner with each other is different between the case where the EGR valve body rotates within the warming-up rotational range and the case where the EGR valve body rotates within the after-warm-up rotational range.

3. The valve device according to claim 2, wherein the warming-up rotational range is included in a rotation range from a fully closed rotational position at which the EGR valve body fully closes the downstream passage to a rotational position at which the EGR valve body is rotated 90 degrees to the other side in the circumferential direction, and the after-warm-up rotational range is included in the rotation range from the fully closed rotational position to a rotational position at which the EGR valve body is rotated 90 degrees to the one side in the circumferential direction.

4. The valve device according to claim 1, wherein the bypass valve body is provided in the second upstream passage and rotates around a bypass valve axis to open and close the second upstream passage, the interlocking portion includes a cam that rotates with the EGR valve body and has a cam track, and a driven rotating portion that rotates with the bypass valve body and has a cam follower, and the driven rotating portion rotates in an interlocking manner with a rotational operation of the cam while causing the cam follower to follow the cam track.

\* \* \* \* \*